US010580056B2

(12) United States Patent
Stoll et al.

(10) Patent No.: US 10,580,056 B2
(45) Date of Patent: Mar. 3, 2020

(54) SYSTEM AND METHOD FOR PROVIDING A GIFT EXCHANGE

(71) Applicant: Walmart Apollo, LLC, Bentonville, AR (US)

(72) Inventors: Nathan Stoll, San Francisco, CA (US); Jan Magnus Stensmo, Foster City, CA (US); Andrew Mark Ellerhorst, San Francisco, CA (US); Abhishek Banerjee, Ann Arbor, MI (US)

(73) Assignee: WALMART APOLLO, LLC, Bentonville, AR (US)

( * ) Notice: Subject to any disclaimer, the term of this patent is extended or adjusted under 35 U.S.C. 154(b) by 982 days.

(21) Appl. No.: 14/673,499

(22) Filed: Mar. 30, 2015

(65) Prior Publication Data

US 2015/0206225 A1 Jul. 23, 2015

Related U.S. Application Data

(63) Continuation-in-part of application No. 13/769,181, filed on Feb. 15, 2013, now abandoned.

(60) Provisional application No. 61/648,578, filed on May 17, 2012, provisional application No. 61/648,591, filed on May 17, 2012, provisional application No. 61/688,655, filed on May 18, 2012.

(51) Int. Cl.
*G06Q 30/00* (2012.01)
*G06Q 30/06* (2012.01)

(52) U.S. Cl.
CPC .................. *G06Q 30/0631* (2013.01)

(58) Field of Classification Search
CPC ................. G06Q 30/0601–0641; G06Q 30/08
USPC ................................................ 705/26.1–27.2
See application file for complete search history.

(56) References Cited

U.S. PATENT DOCUMENTS 5,550,576 A 8/1996 Klosterman
5,983,004 A 11/1999 Shaw et al.
(Continued)

FOREIGN PATENT DOCUMENTS

AU 2010017596 2/2010
JP 2004326634 11/2004
(Continued)

OTHER PUBLICATIONS

International Search Report and Written Opinion, PCT/US2013/041700, dated Sep. 17, 2013, 14 pgs.
(Continued)

*Primary Examiner* — Jason B Dunham
*Assistant Examiner* — Anand R Loharikar
(74) *Attorney, Agent, or Firm* — Bryan Cave Leighton Paisner LLP

(57) ABSTRACT

In some embodiments, a method comprises receiving at least two parameters for a gift exchange from an organizer of the gift exchange. The at least two parameters can comprise a set of participants and a budget. The method further comprises identifying a gift exchange recipient for a respective participant in the set of participants, determining one or more gifts for the gift exchange recipient based at least in part on the budget and a first trust graph, and arranging for display the one or more determined gifts to the respective participant. In many embodiments, the first trust comprises levels of trust associated with the gift exchange recipient. Other embodiments also are disclosed herein.

20 Claims, 19 Drawing Sheets

(56) References Cited

U.S. PATENT DOCUMENTS

| | | |
|---|---|---|
| 6,185,221 B1 | 2/2001 | Aybay |
| 6,370,381 B1 | 4/2002 | Minnick |
| 6,487,390 B1 | 11/2002 | Virine |
| 6,912,588 B1 | 6/2005 | Jardin |
| 7,092,381 B2 | 8/2006 | Carlsson et al. |
| 7,302,429 B1 | 11/2007 | Wanker |
| 7,330,895 B1 | 2/2008 | Horvitz |
| 7,797,196 B1 | 9/2010 | Aaron et al. |
| 7,831,439 B1 | 11/2010 | Bryar et al. |
| 7,925,542 B2 | 4/2011 | Shah |
| 8,064,342 B2 | 11/2011 | Badger |
| 8,095,521 B2 | 1/2012 | Chan et al. |
| 8,170,897 B1 | 5/2012 | Cohen et al. |
| 8,181,232 B2 | 5/2012 | Grandcolas |
| 8,224,823 B1 | 7/2012 | Amacker |
| 8,407,765 B2 | 3/2013 | Wiley et al. |
| 8,612,208 B2 | 12/2013 | Cooper |
| 8,626,604 B1 | 1/2014 | Gandhi |
| 8,635,227 B2 | 1/2014 | Sankhla |
| 8,739,016 B1 | 5/2014 | Goldman et al. |
| 8,775,529 B2 | 7/2014 | Wright et al. |
| 8,935,192 B1 | 1/2015 | Ventilla et al. |
| 8,976,665 B2 | 3/2015 | Wiley et al. |
| 9,094,257 B2 | 7/2015 | Morrill et al. |
| 9,184,898 B2 | 11/2015 | Love et al. |
| 9,264,329 B2 | 2/2016 | Chrapko |
| 2001/0011235 A1 | 8/2001 | Kim et al. |
| 2001/0016496 A1 | 8/2001 | Lee |
| 2002/0052752 A1 | 5/2002 | Landesmann |
| 2002/0078138 A1 | 6/2002 | Huang |
| 2002/0087704 A1 | 7/2002 | Chesnais et al. |
| 2002/0099653 A1 | 7/2002 | De Souza et al. |
| 2002/0120581 A1 | 8/2002 | Schiavone |
| 2002/0188947 A1 | 12/2002 | Wang |
| 2003/0046173 A1 | 3/2003 | Benjier |
| 2003/0054827 A1 | 3/2003 | Schmidl et al. |
| 2003/0056216 A1 | 3/2003 | Wugofski et al. |
| 2003/0074253 A1 | 4/2003 | Scheuring et al. |
| 2003/0149580 A1 | 8/2003 | Moores |
| 2003/0188252 A1 | 10/2003 | Kim et al. |
| 2003/0127291 A1 | 11/2003 | Schramm-Apple et al. |
| 2004/0111374 A1 | 6/2004 | Goldstein |
| 2004/0117482 A1 | 6/2004 | Salazar |
| 2004/0117860 A1 | 6/2004 | Yi et al. |
| 2005/0004837 A1 | 1/2005 | Sweeney et al. |
| 2005/0086694 A1 | 4/2005 | Hicks et al. |
| 2005/0187883 A1 | 8/2005 | Bishop |
| 2005/0216144 A1 | 9/2005 | Baldassa |
| 2006/0047598 A1 | 3/2006 | Hansen |
| 2006/0277591 A1 | 12/2006 | Arnold et al. |
| 2007/0043583 A1 | 2/2007 | Davulcu et al. |
| 2007/0143816 A1 | 6/2007 | Gupta et al. |
| 2007/0199019 A1 | 8/2007 | Angiolillo et al. |
| 2007/0219880 A1 | 9/2007 | Stone et al. |
| 2007/0239552 A1 | 10/2007 | Sundaresan |
| 2007/0266097 A1 | 11/2007 | Harik et al. |
| 2008/0065445 A1 | 3/2008 | Livesay et al. |
| 2008/0177763 A1 | 7/2008 | Lang et al. |
| 2008/0271080 A1 | 10/2008 | Gossweiler et al. |
| 2008/0300940 A1 | 12/2008 | Aravamudan |
| 2009/0013053 A1 | 1/2009 | Wehner |
| 2009/0019484 A1 | 1/2009 | Jo et al. |
| 2009/0106366 A1 | 4/2009 | Virtanen et al. |
| 2009/0132395 A1 | 5/2009 | Lam |
| 2009/0171760 A1* | 7/2009 | Aarnio .................. G06Q 30/02 705/14.66 |
| 2009/0175214 A1 | 7/2009 | Sfar et al. |
| 2009/0190544 A1 | 7/2009 | Meylan et al. |
| 2009/0028339 A1 | 9/2009 | Wolf |
| 2009/0222873 A1 | 9/2009 | Einarsson |
| 2009/0228339 A1 | 9/2009 | Wolf et al. |
| 2009/0234749 A1 | 9/2009 | Fjellanger et al. |
| 2009/0276284 A1 | 11/2009 | Yost |
| 2009/0319436 A1 | 12/2009 | Andra et al. |
| 2010/0049654 A1 | 2/2010 | Pilo |
| 2010/0076775 A1 | 3/2010 | Tesler et al. |
| 2010/0115419 A1* | 5/2010 | Mizuno ................. G06Q 30/02 715/745 |
| 2010/0235256 A1 | 9/2010 | Kang |
| 2010/0279618 A1 | 11/2010 | Morton et al. |
| 2010/0312724 A1 | 12/2010 | Pinckney |
| 2011/0022465 A1 | 1/2011 | Malleshaiah et al. |
| 2011/0106674 A1 | 5/2011 | Perlman |
| 2011/0131106 A1 | 6/2011 | Eberstadt et al. |
| 2011/0173056 A1 | 7/2011 | D'Alessio et al. |
| 2011/0173095 A1 | 7/2011 | Kassaei et al. |
| 2011/0225048 A1 | 9/2011 | Nair |
| 2011/0252121 A1 | 10/2011 | Borgs |
| 2011/0255448 A1 | 10/2011 | Hartman et al. |
| 2011/0276377 A1 | 11/2011 | Kim |
| 2011/0276631 A1 | 11/2011 | Schmitt |
| 2011/0282941 A1 | 11/2011 | Chan et al. |
| 2011/0320373 A1 | 12/2011 | Lee et al. |
| 2012/0005209 A1 | 1/2012 | Rinearson et al. |
| 2012/0016678 A1 | 1/2012 | Gruber et al. |
| 2012/0030210 A1 | 2/2012 | Sankhla et al. |
| 2012/0065884 A1 | 3/2012 | Sung et al. |
| 2012/0095841 A1 | 4/2012 | Luckerman et al. |
| 2012/0095862 A1 | 4/2012 | Schiff |
| 2012/0109781 A1 | 5/2012 | Felt |
| 2012/0109792 A1 | 5/2012 | Eftekhari |
| 2012/0117584 A1 | 5/2012 | Gordon |
| 2012/0136756 A1 | 5/2012 | Jitkoff et al. |
| 2012/0163309 A1 | 6/2012 | Ma et al. |
| 2012/0166333 A1 | 6/2012 | Von Behren et al. |
| 2012/0170534 A1 | 7/2012 | Kim et al. |
| 2012/0197722 A1 | 8/2012 | Mesaros |
| 2012/0197979 A1 | 8/2012 | Palm |
| 2012/0203832 A1 | 8/2012 | Vastardis et al. |
| 2012/0209839 A1 | 8/2012 | Andrews et al. |
| 2012/0253790 A1 | 10/2012 | Heck et al. |
| 2012/0254096 A1 | 10/2012 | Flinn et al. |
| 2012/0278127 A1 | 11/2012 | Kirakosyan |
| 2012/0278625 A1 | 11/2012 | Narayanan et al. |
| 2012/0284144 A1 | 11/2012 | Herbst et al. |
| 2012/0290399 A1 | 11/2012 | England |
| 2012/0296978 A1 | 11/2012 | Inoue |
| 2012/0303425 A1 | 11/2012 | Katzin et al. |
| 2012/0330980 A1 | 12/2012 | Rubin et al. |
| 2013/0013807 A1 | 1/2013 | Charapko et al. |
| 2013/0054407 A1 | 2/2013 | Sabur |
| 2013/0060625 A1 | 3/2013 | Davis et al. |
| 2013/0060850 A1 | 3/2013 | Davis |
| 2013/0073989 A1 | 3/2013 | Harris |
| 2013/0091013 A1 | 4/2013 | Wang |
| 2013/0094537 A1 | 4/2013 | Hui et al. |
| 2013/0097056 A1 | 4/2013 | Sun et al. |
| 2013/0097142 A1 | 4/2013 | Kim et al. |
| 2013/0124357 A1* | 5/2013 | He .......................... G06Q 30/08 705/26.3 |
| 2013/0173334 A1 | 7/2013 | Etchegoyen |
| 2013/0178239 A1 | 7/2013 | Roberts et al. |
| 2013/0179440 A1 | 7/2013 | Gordon |
| 2013/0191316 A1 | 7/2013 | Etchegoyen |
| 2013/0219468 A1 | 8/2013 | Bell |
| 2013/0291007 A1 | 10/2013 | Shimy et al. |
| 2013/0332307 A1 | 12/2013 | Linden |
| 2014/0258243 A1 | 9/2014 | Bell |

FOREIGN PATENT DOCUMENTS

| | | |
|---|---|---|
| JP | 2007249833 | 9/2007 |
| JP | 2009123192 | 6/2009 |
| JP | 2011170471 | 9/2011 |
| KR | 20010076971 | 8/2001 |
| KR | 20020090816 | 12/2002 |
| KR | 100825204 | 4/2008 |
| KR | 20110117475 | 10/2011 |

(56) References Cited

FOREIGN PATENT DOCUMENTS

| | | |
|---|---|---|
| WO | 2010017596 | 2/2010 |
| WO | 2010099632 | 9/2010 |

OTHER PUBLICATIONS

International Search Report and Written Opinion, PCT/US2013/041702, dated Aug. 27, 2013, 12 pgs.

International Search Report and Written Opinion, PCT/US2013/041705, dated Aug. 27, 2013, 12 pgs.

International Search Report and Written Opinion, PCT/US2013/041707, dated Aug. 27, 2013, 10 pgs.

International Search Report and Written Opinion, PCT/US2013/041714, dated Aug. 27, 2013, 11 pgs.

Blake, P. (1997), Exploring the news, Information World Review, (121), 17-18, Retrieved from http://search.proquest.com/docview/199371966?accountid=14753.

"Propagation of Trust and Distrust." Guha, R.; Kumar, Ravi; Raghavan, Prabhakar; Tomkins, Andrew. WWW '04 Procedding of the 13th. Mar. 2004.

Adweek. (Apr. 23, 2009). Retailers Utilize Facebook Connect to Make Online Shipping More Social, Personal. Retrieved Apr. 14, 2017, from http://www.adweek.com/digital/retailers-utilize-facebook-connect-to-make-shopping-more-social-personal/ Apr. 23, 2009.

Entrepreneurr. (Mar. 17, 2012). A Platform for Stylepreneurs: Pintrest Meets Online Department Store. Retrieved Apr. 14, 2017, from http://web-beta.archive.org/web/20120319191411/https://www.entrepreneur.com/article/222812 Mar. 17, 2012.

Merriam-Webster, "cease", 2015 Aug. 4, 2015.

Merriam-Webster, "majority", 2015 Aug. 4, 2015.

Merriam-Webster, "primary", 2015 Aug. 4, 2015.

Merriam-Webster, "log on", 2016 May 20, 2016.

Merriam-Webster, "log out", 2016 May 20, 2016.

Merriam-Webster, "schedule", 2016 Jan. 1, 2016.

Talisma email and answer product combo addresses volume email challengers. (Jul. 31, 2008). Business Wire, retrieved from https://dialog.proquest.com/professional/docview/677381891?accountid=142257 Jul. 31, 2008.

\* cited by examiner

SYSTEM AND METHOD FOR PROVIDING A GIFT EXCHANGE

RELATED APPLICATIONS

This application is a continuation in part of U.S. application Ser. No. 13/769,181, entitled "Trust Graphs," filed Feb. 15, 2013, which claims priority to U.S. Provisional Patent Application Nos. 61/648,578, entitled "Trust Graphs," filed May 17, 2012, 61/648,591, entitled "System And Method For Social Network Based Referrals," filed May 17, 2012, and 61/688,655, entitled "System And Method For Social Network Based Referrals," filed May 18, 2012. All of these applications are incorporated by reference herein in their entirety.

TECHNICAL FIELD

The disclosed embodiments relate generally to the field of online commerce and, more particularly, to using trust connections to improve product recommendations (e.g., recommendations for goods and services) and purchasing of products.

BACKGROUND

Over the last two decades, buying and the selling of products through computer networks (e.g., via the Internet) has increased dramatically. A significant portion of all commerce is now conducted online through the Internet. As the amount of commerce conducted online grows, the number of online commerce venues also grows. As such, online vendors compete with each other to offer users the best user experience. One way to differentiate from other online retailers is to provide products most suitable to the needs of the users.

Purchasing goods and services online has advantages and drawbacks. Purchasing goods online allows consumers to shop and compare products easily from their own home or mobile device. Additionally, consumers have a much wider range of goods available for selection. Thus, consumers can quickly search through and review many options.

However, when shopping online, the social aspects of more traditional commerce are lost. The large number of options available to consumers may result in difficulty finding a product that suits the consumer's needs. Traditionally, consumers can rely on social structures to help evaluate different options when shopping. For example, when shopping in a retail store, shoppers can get purchasing advice from salespeople or friends and family who accompany them. Shopping online removes this social experience as it is typically done alone.

Additionally, purchasing goods and services online can be more complicated than purchasing goods in person. For example, online purchasing often involves filling out time-consuming forms, including manually inputting payment methods and arranging for shipment of the product. Then, unlike traditional shopping, the purchaser must wait for delivery of the good. As such, online commerce websites need to focus on the advantages of shopping online, while also minimizing the disadvantages.

Another significant use of computer networks, such as the Internet, is computer based social networking. Websites like Facebook and Twitter allow their users to find and maintain relationships with other people through status updates and messages. Users can keep maintain awareness of the lives of their friends, family members, and acquaintances that would otherwise be difficult to keep in close contact with.

BRIEF DESCRIPTION OF THE DRAWINGS

To facilitate further description of the embodiments, the following drawings are provided in which.

Figure 1:
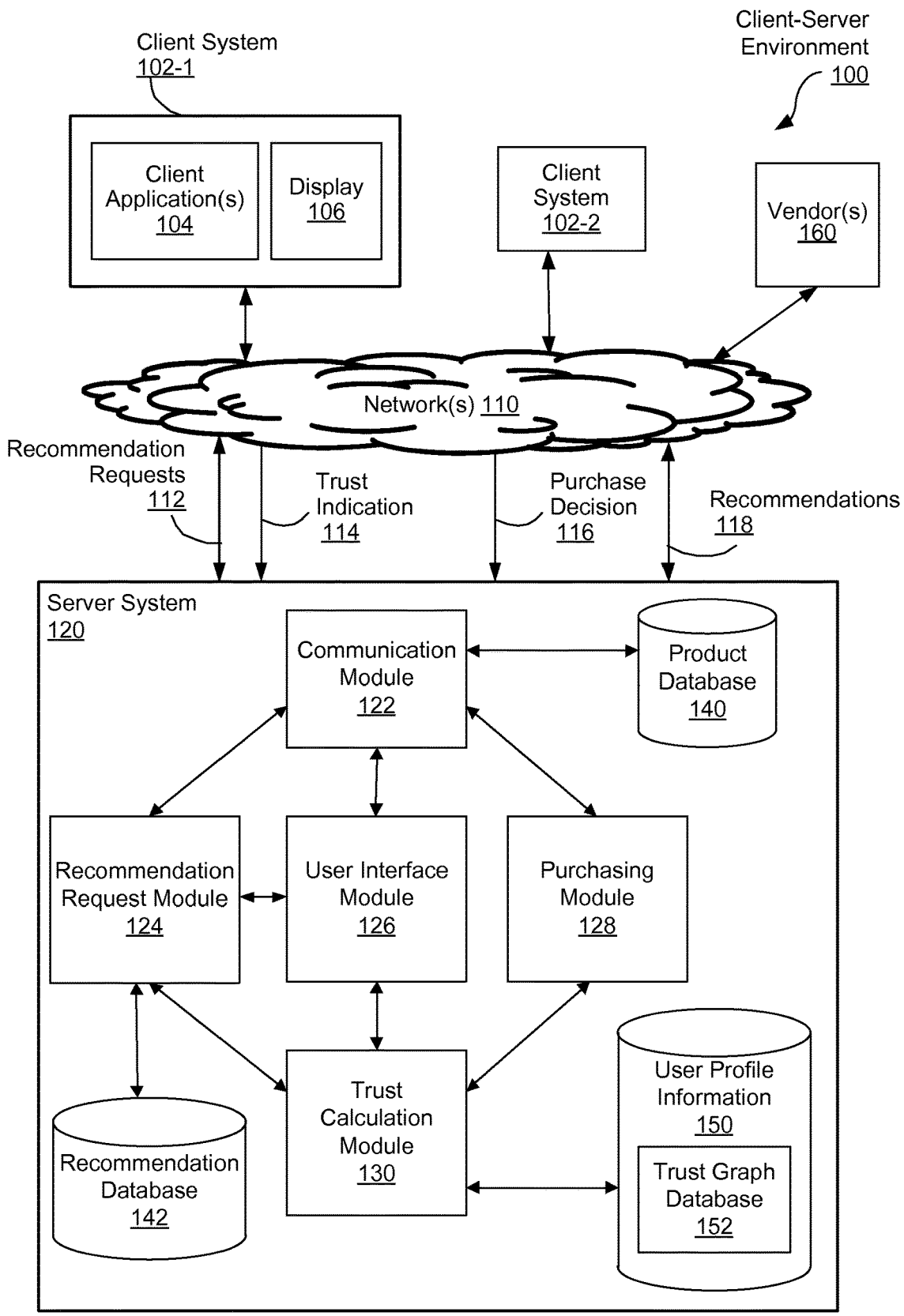
FIG. 1 is a block diagram illustrating a client-server environment in accordance with some embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments of systems and methods of trusted gifting include a method comprising identifying a first user, identifying a second associated with an event and determining one or more potential products for the second user according to one or more criteria. In many embodiments, the method further comprises causing at least one product of the one or more determined potential products to be purchased for the second user by the first user.

Many embodiments include a system comprising one or more processors and memory storing one or more programs to be executed by the one or more processors. In many embodiments, the one or more programs comprise instructions for identifying a first user, identifying a second user associated with an event, determining one or more potential products for the second user according to one or more criteria, and causing at least one product of the one or more determined potential products to be purchased for the second user by the first user.

Some embodiments include a system comprising one or more processors and memory storing one or more programs to be executed by the one or more processors. In many embodiments, the one or more programs comprising instructions for identifying a first user, identifying a second user associated with an event, determining one or more potential products for the second user according to one or more predefined criteria, and causing at least one product of the one or more determined potential products to be purchased for the second user by the first user. In many embodiments the one or more predefined criteria include at least one of a first trust graph associated with the first user or a second trust graph associated with the second user. In some embodiments, the first trust graph comprises at least one level of trust associated with the first user and the second trust graph comprises at least one level of trust associated with the second user.

Various embodiments of systems and methods for providing a gift exchange include a method comprises receiving at least two parameters for a gift exchange from an organizer of the gift exchange. The at least two parameters can comprise a set of participants and a budget. The method further comprises identifying a gift exchange recipient for a respective participant in the set of participants, determining one or more gifts for the gift exchange recipient based at least in part on the budget and a first trust graph, and arranging for display the one or more determined gifts to the respective participant. In many embodiments, the first trust comprises levels of trust associated with the gift exchange recipient.

In some embodiments, a method comprises receiving two or more gift exchange parameters from an organizer of a gift exchange, identifying a gift exchange recipient for a respective participant in a set of participants, determining one or more gifts for the gift exchange recipient, and arranging for display the one or more determined gifts to the respective participant. In some embodiments, identifying the gift exchange recipient for the respective participant in the set of participants comprises identifying the gift exchange recipient based at least in part on a first trust graph, the first trust graph is associated with the respective participant, the gift exchange recipient is identified at random from the set of participants, and determining one or more gifts for the gift exchange recipient comprises determining the one or more gifts based at least in part on the budget and a second trust graph, the second trust graph associated with the gift exchange recipient.

In many embodiments, a system comprises one or more processors and memory storing one or more programs to be executed by the one or more processors. In some embodiments, the one or more programs comprise instructions for receiving at least two gift exchange parameters from an organizer of a gift exchange, the at least two gift exchange parameters at least comprise a set of participants and a budget, identifying a gift exchange recipient for a respective participant in the set of participants, and determining one or more gifts for the gift exchange recipient based at least in part on the budget and a first trust graph, the first trust graph is associated with the identified gift exchange recipient.

Various embodiments of methods and systems for purchasing products via a subscription method include a method comprising presenting a subscription mechanism corresponding to a first user, wherein the subscription mechanism is associated with a set of products. In many embodiments, the method further comprises receiving a notification from a second user selecting the subscription mechanism corresponding to the first user, determining that one or more conditions are satisfied, and causing at least a portion of the set of products associated with the subscription mechanism to be purchased by the second user.

In some embodiments, a method comprises determining that a trust level associated with a first user in a trust graph of a second user meets or exceeds a defined trust level, presenting to the second user a subscription mechanism corresponding to the first user, the subscription mechanism is associated with a set of products, and receiving a notification from the second user selecting the subscription mechanism corresponding to the first user. In many embodiments, the method further comprises determining that one or more conditions are satisfied and causing at least one product in the set of products associated with the subscription mechanism to be purchased by the second user. In some embodiments, the one or more conditions comprise at least one of: (1) a first condition when the set of products associated with the subscription mechanism corresponds to at least one of one or more categories selected by the second user; (2) a second condition when the set of products associated with the subscription mechanism does not exceed a budget defined by the second user; or (3) a third condition when the set of products associated with the subscription mechanism corresponding to the first user has changed since the second user last purchased the set of products associated with the subscription mechanism corresponding to the first user.

In some embodiments, a system comprises one or more processors and memory storing one or more programs to be executed by the one or more processors. The one or more programs comprise instructions for presenting to a second user a subscription mechanism corresponding to a first user in a community of users, the subscription mechanism is associated with a set of products, and receiving a notification from the second user selecting the subscription mechanism corresponding to the first user. In many embodiments, the one or more programs can further comprise instructions for determining that one or more conditions are satisfied and causing at least one product in the set of products associated with the subscription mechanism to be purchased by the second user.

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Description of Examples of Embodiments," one will understand how the aspects of various embodiments are used to utilize trust graphs to purchase and recommend products.

In some embodiments, a method of managing a gift exchange is performed by system. In many embodiments, the system is a server (e.g., server system 120, FIGS. 1 and 3) with one or more processors and memory. In some embodiments, the system comprises an input and a display. The method includes receiving from an organizer of the gift exchange two or more gift exchange parameters, the two or more gift exchange parameters at least including a set of participants and a budget. In some embodiments, the budget can comprise a budget range. In other embodiments, the budget can comprise a "not to exceed" number or a minimum number. The method also includes, for a respective participant in the set of participants: identifying a gift exchange recipient; and determining one or more gifts for the identified gift exchange recipient based at least in part on the budget and a trust graph associated with the identified gift exchange recipient.

In some implementations, a server system is provided for improving the reliability of an Internet-based commerce service through social network based product recommendations using a trust graph that represents trust between a user who wishes to request recommendations for goods or services (hereinafter a "requesting user") and a user who is a candidate to provide a recommendation for those goods or services (hereinafter a "recommending user").

The term "requesting user," as used herein, does not necessarily imply that the requesting user is currently requesting a recommendation. Rather, the requesting user is a user who is participating in a service (e.g., an Internet-based commerce service or social network) in a manner that allows him or her to request recommendations (for example, in accordance with a trust graph). Likewise, the term "recommending user," as used herein, does not necessarily imply that the recommending user is currently issuing (e.g., providing) recommendations. Rather, the recommending user is a user who is participating in a service in a manner that allows him or her to issue recommendations. In some embodiments, a recommending user may be a requesting user in another context. A single user of a service can be simultaneously a recommending user and a requesting user (e.g., both the requesting user and the recommending user are simply users of a service provided by the server system).

In some embodiments, the server system maintains a record of the trust relationships for each user of a plurality of users registered with the commerce service provided by the server system. In some implementations, the server system then uses this information to identify the most trusted recommending users in at least one area of a particular user's trust graph. In some embodiments, the server system maintains or stores the record of trust relationships for each user in a trust graph. In some embodiments, the plurality of users registered with the commerce service comprises a community of users and are each associated with an account or user profile.

In some implementations, the server system receives a trust indication from a requesting user. The trust indication includes information identifying a recommending user. The recommending user is a respective user of a plurality of users registered with the server system. The trust indication also includes a trust level (sometimes called a trust value) that represents a level of trust that the requesting user has for the recommending user. In some implementations, the trust graph is a directed graph, meaning that a particular trust indication indicates only the level of trust that the requesting user has for the recommending user and not the level of trust between the recommending user and the requesting user. As the requesting user sends more trust indications to the server, the directed trust graph for the recommending user includes more trust information and becomes more useful. For example, a requesting user Bob may send three trust indications to the server system, indicating that he trusts Joe, Phil, and Deborah, respectively, each with a high trust level. As described in more detail below, in some embodiments, the indicated trust levels correspond to a particular category of goods and/or services (e.g., "men's formal wear"). The server system stores these trust indications in a directed trust graph for Bob. Because the trust graph is directed, the server system does not infer, based on Bob's trust level toward them, trust levels from Joe, Phil, and Deborah (e.g., when they act as requesting users) toward Bob (e.g., when he acts as a recommending user).

In some implementations, a trust level is represented by a numerical value between 0 and 1, with 0 indicating no trust and 1 indicating maximum trust. In other implementations, the trust level is represented by a numerical value between −1 and 1, in which 1 indicates maximum trust, −1 indicates maximum distrust, and 0 indicates no current trust information. For example, if Jim totally trusts his friend Pam, he would indicate a trust level (e.g., trust value) of 1. For Jim's friend Andy, whom he trusts, but not as much as Pam, Jim would indicate a trust level between 0 and 1, such as 0.5. For a distrusted person, Jim would indicate a trust level below 0 but above −1, such as −0.5. It should be understood, however, that other numerical values and/or ranges of values can be used.

In accordance with some implementations, the server system infers trust information by identifying actions (e.g., behavior) taken by a particular user and determining the trust level indicated by the identified actions. For example, if the server system determines that Jim has received a recommendation for a pair of shoes from Andy, in some embodiments, the server system measures Jim's response to determine a trust level between Andy and Jim. If Jim purchases the recommended pair of shoes, the system determines an increased level of trust from Jim to Andy. If Jim takes no action based on the recommendation, the trust level remains unchanged or, if the server system detects a pattern of ignoring recommendations from Andy, in some embodiments, the trust level is slightly reduced.

In some implementations, each user of the system has a "trustworthiness" score. The trustworthiness score represents an overall rating of the quality and usefulness of a respective user's recommendations. In some embodiments, the trustworthiness score is tied to a particular category of goods and/or services (e.g., a user John may have a high trustworthiness score with respect to men's formal wear and a low trustworthiness score with respect to women's formal wear). In some implementations, the trustworthiness score is represented by a number between 0 and 1. In other implementations, the trustworthiness score is a value with a lower bound of 0, but no upper bound. In yet other implementations, the trustworthiness score can have a negative value. In this case, a respective user's trustworthiness score increases in response to indications that the respective user's recommendations are good. For example, as users of the service choose to buy a product in response to a recommendation from a particular user, the trustworthiness score for the particular user would increase. Correspondingly, recommendations that are ignored or explicitly rejected result in either no change of trustworthiness score or, alternatively, in a lowered trustworthiness score.

In some implementations, a higher trustworthiness score represents a higher level of trustworthiness with respect to recommendations for products (e.g., goods or services). In some implementations, if a user's trustworthiness score exceeds a predetermined level, the user will be noted as a tastemaker or a very influential user.

In some implementations, trust levels are transitive between users. For example, if Jim trusts Pam with a trust level of 1 and Pam trusts Michael with a trust level of 0.75, in some embodiments, the server system calculates a trust level from Jim to Michael. In some implementations, the server system calculates transitive trust by taking the trust level from Pam to Michael and discounting it by a fixed (e.g., predefined) amount. For example, the trust level may be reduced by 5% for each degree of removal from Jim (e.g., each degree away from Jim on Jim's trust graph). For example, in such embodiments, Jim's trust level for Michael is calculated as the product of Jim's trust for Pam, Pam's trust for Michael, and a number corresponding to the reduction for each degree, e.g., 1×0.75×0.95=0.7125. In some implementations, transitive trust values are calculated before a need for such calculated values arises. In other implementations, only direct trust values are stored in the trust graphs and transitive trust values are calculated when required, such as when a request for a recommendation is received by the server system.

In some implementations, transitive trust is calculated through multiple users. For example, user A trusts user B, user B trusts user C, and user C trusts user D. Transitive trust of user A can be calculated for both users C and D, and additionally for any users trusted by users B, C, and/or D. In some implementations, transitive trust is calculated for as many other users and through as many connections as possible. In other implementations, the server system limits the number of connections through which an implicit trust calculation is made. By limiting the number of connections (for example, to no greater than 10 connections) the server system avoids using resources on tenuous connections.

In some implementations, the transitive trust calculations result in more than one possible value of transitive trust from a requesting user to a recommending user. For example, if user A trusts users B and C, and both users B and C trust user D, the value of the implicit trust calculation will depend on whether the connection is made through user B or user C. In some implementations, all possible trust levels are averaged (e.g., using a mean, median, mode, and/or a weighted mean) to determine the implicit trust level. In other implementations, the server system selects either the highest or lowest trust level. In yet other implementations, the server system selects the implicit trust value that relies on the fewest number of connections. In some embodiments, if a plurality of implicit trust values are each calculated using the fewest number of connections (e.g., there exists more than one trust path through the requesting user's trust graph having the fewest number of connections), the multiple trust values are averaged.

In some implementations, an aggregate trust value P is calculated for multiple trust paths by using a probabilistic combination algorithm. As an example of such an algorithm, in some embodiments, a function $P=1-(1-p_1)\times(1-p_2)\times \ldots (1-p_n)$ is used to calculate the aggregated trust level P by using trust values $p_1$ through $p_n$, each of which represent a trust level from a plurality of different trust paths. For example, if one path gives a trust value of 0.8 and another gives a trust value of 0.63, the aggregate trust level according to this approach is calculated as $1-(1-0.8)\times(1-0.63)=0.926$. This function can be used for an arbitrary number of different trust paths.

In some implementations, a trust indication from a requesting user to a recommending user indicates a specific category in which the indicated trust level applies. For example, Bob may trust Alice at a high level in one category of product, such as consumer electronics, but trust Alice at a lower level for a second type of product, such as men's shoes. Thus, when the requesting user submits a trust indication of a trust level for the recommending user, in some embodiments, the trust indication includes a category of products or services for which the trust level applies. In this way, the trust graph can include different trust levels for different categories of products. In some implementations, the different categories are arranged in a hierarchy of categories. In some implementations, the highest hierarchical level is a general level (e.g., indicating a general level of trust in a user) and there are a plurality of sub-levels underneath the general level. For example, the plurality of sub-levels can includes levels such as "fashion," "electronics," and "media," among others. Each sub-level can be a parent sub-level having one or more child sub-levels underneath it, unless the sub-level is a leaf node of the hierarchy of categories (e.g., a sub-level has a genus-species relationship with respect to its child sub-levels). For example, the sub-level "fashion" could include child sub-levels for "women's wear," "men's wear," and "kid's wear."

In some implementations, the server system propagates trust levels from a sub-level to higher hierarchical levels (e.g., more general categories in the hierarchy of categories, also called "parent sub-levels" or "parent categories") and/or to lower hierarchical levels (e.g., more specific categories in the hierarchy of categories, also called "child sub-levels" or "child categories"). In some implementations, trust levels are passed to (e.g., inherited by) child categories without alteration, but trust levels are discounted when passed to parent categories in the hierarchy. For example, Jim trusts Andy with a trust level of 0.5 in the category "shoes." That trust level is propagated to lower, more specific categories, such as "athletic shoes" or "formal shoes," without discount. However, when the trust level is propagated to a higher category, such as "fashion," the trust level is discounted by a fixed amount (e.g., 10%). Thus, in this example, the graph determines that Jim trusts Andy with respect to "fashion" at the level of 0.45 (e.g., the discounted trust level is calculated as $p(1-r)$, where p is the trust level for the child sub-level and r is the fixed amount by which the trust level for the child sub-level is reduced when calculating a trust level for a parent sub-level). In some embodiments, trust levels are discounted in an analogous manner when passed to lower, more specific categories.

In some implementations, the server system uses the gathered trust information to improve a user's experience (UX). The server system allows a requesting user to request recommendations for goods and services that the requesting user is interested in purchasing. The server system uses the stored trust graphs to identify trusted potential recommending users. The server system receives a request for a recommendation from a requesting user. The request for recommendation includes a category of goods or services that defines the type of recommendation the requesting user wants. The server system uses the trust graph associated with the requesting user, among other factors, to determine one or more candidate recommending users from whom to request a recommendation and/or in the same or different embodiment, provide to the requesting user a previous recommendations from one or more candidate recommending users.

In some implementations, when a user registers with the server system to participate in the online commerce system, the user has little or no trust information regarding other users. The server system can collect user information from other social networks (Facebook, Twitter, LinkedIn, etc) or from Gmail/webmail address books to identify other users of the server system that the new user might wish to trust. The server system then displays trust recommendations to the user. In some implementations, the server system accesses the social network information (and/or Gmail/webmail address book information) only with the express permission of the user. In some implementations, the server system gathers demographic information from the new user and uses that demographic information (e.g., user age or age range, geographical location, income level, education level) to determine recommended products and other users that the potential new user may wish to trust.

In some implementations, the server system uses the social network and demographic information gathered from external sources, as described above, to determine recommendations from the user's social network prior to receiving adequate trust level information from the user. In some implementations, the server system uses general product popularity data to find recommendations for users without sufficient trust information. General product popularity data is data that describes how popular particular products are within their product category (e.g., in the hierarchy of categories). In other implementations, the server system uses direct editorial control (e.g., an editor selecting specific recommendations) to supply recommendations prior to receiving adequate trust level information from the user.

In some implementations, the server system will identify one or more users not already trusted by a requesting user (user A) that the server system has determined are likely to be trusted by the requesting user. In some implementations, the server system identifies the one or more users by finding connections or similarities between the one or more users and the requesting user. For example, if multiple users trusted by the requesting user all trust a particular other user (e.g., a particular person), the server system determines that the requesting user will likely trust the other user. In other implementations, the server system identifies one or more users that have similar identified interests as the requesting user or have recommended similar products to those recommended by the requesting user. In yet other implementations, the server system identifies one or more users likely to be trusted by the requesting user using social connection information from a third-party website or service, interactions that the users have had with the server system, and any other information the server system has with regard to the users.

In some implementations, the server system identifies a particular category in which the requesting user is likely to trust the one or more users. In some implementations, the server system identifies one or more users likely to be trusted by the requesting user in response to a request from the requesting user for recommendations of users to trust. In some implementations, the server system transmits the identified one or more users to the requesting user for display. In some implementations, the server system also transmits information describing the reasons why the server system selected a particular user. Variously, the information can be automatically (e.g., concurrently) displayed with the recommendation or displayed at the request of the requesting user. For example, the server system transmits a recommendation for Bob to trust Ernie and includes the fact that Ernie was identified because three people trusted by Bob (Alice, Carol, and Dan) also trust Ernie.

In some implementations, the one or more identified users are recommended only in a particular category. In response to receiving a recommendation to trust a recommending user in a specific category, the requesting user can choose to trust the user only in the recommended category, trust the user in a narrower/lower category than the recommended category, or trust the user in a broader/higher category than the recommended category. For example, the server system recommends that Bob trust Ernie in men's formal clothes.

Bob has the option of trusting Ernie in only men's formal clothes, in a narrower category (e.g., a child category) such as men's belts, or a broader category (e.g., parent category) such as menswear. In some implementations, the requesting user can request to view public information about an identified recommending user while determining whether to trust the user or not. In some implementations, the requesting user can only see information that the identified user has explicitly marked as public. For example, Ernie may have made public his recommendations in menswear, and Bob can view the recommendations as part of his decision as to whether or not to trust Ernie.

In accordance with some implementations, in response to receiving a request for a recommendation, the server system determines a list of users in the requesting user's trust graph that have trust levels in the category requested by the user. The server system ranks the one or more users in order of trust level. In some implementations, the client system calculates transitive trust values for users with whom the requesting user does not have a direct trust level and includes at least some of these users in the list. Transitive trust values may also be pre-calculated and stored in the server system. When a server system receives a request for a recommendation, the server system determines whether additional transitive trust values need to be calculated. In some implementations, only some transitive trust values are pre-calculated and others are calculated as needed. For example, in some embodiments, only first-order transitive trust values are pre-calculated and all other transitive trust values are calculated as needed. First-order transitive trust values are trust values that have only one indirect trust link. For example, if Bob directly trusts Alice and Cody, then the first-order transitive trust values are calculated for users directly trusted by Alice and Cody.

In some implementations, the server system also includes (e.g., in the list) users who are designated as highly influential users over the entire system (or large portions of the system) for the requested category. For example, if Bob is highly trusted by a significant portion of registered users and has a high number of successful recommendations, Bob may be designated as a highly influential user with respect to a specific category.

In some implementations, the server system then selects a number of users to be included on the list. In some implementations, this number is a predetermined number, such as three. In other implementations, this number includes all the users above a certain trust level. In yet other implementations, this number is a variable number depending on a variety of factors, such as the number of recommendations already requested and the number of previous recommendations that have been accepted. For example, the server system may order 20 users ranked from highest to lowest trust. The server system then determines the three most highly trusted users that have not had a recommendation request within the last two days. In this way, the server system avoids flooding users with too many requests for recommendations. In the same or different embodiments, the server system can provide incentives or rewards to the recommending users for responding to the requests for recommendations to motivate the recommending users to respond. Similarly, the server system can monitor whether the recommending users respond to the requests for recommendation, and can send fewer or no requests to particular recommending users if the particular recommending users do not respond to the requests in a timely manner or at all regardless of how highly ranked the particular recommending users are. After a predetermined or other time period, the server system can reset and resume sending the normal quantity of requests for recommendations to the particular recommending users.

In some implementations, the server system sends a message to the selected users, requesting a recommendation in the selected category. The message can be sent over any communication medium available to the user, including, but not limited to, email, text message, Twitter, Facebook message/post, voicemail, social media instant message, and/or a messaging service internal to the server system. The server system then waits a predetermined amount of time. In some implementations, the predetermined amount of time is standard across the entire system. In other implementations, the predetermined amount of time is determined in accordance with one or more urgency characteristics of the request.

As an example of an urgency characteristic of the request, in some implementations, when submitting a request, the requesting user indicates a time frame in which he or she wants the request for a recommendation to be fulfilled. The server system selects a predetermined amount of time such that any recommendations will be received before the end of the indicated time frame. For example, the requesting user emails a request for a recommendation for a smart phone to the server system and indicates he would like a recommendation within 24 hours. The server system then determines an appropriate period of time, such as eight hours, to wait for recommendations. If a recommendation is not received within eight hours, the server system takes action to ensure that recommendations are received within the 24 hour period (e.g., by sending a request for a recommendation to additional users).

In accordance with some implementations, when the predetermined amount of time has passed, the server system determines whether any recommendations have been returned. Such returned recommendations can be received by the server system through any form of communication available to the recommending user. For example, if the request for a recommendation is sent to the user through his email service, the user may reply directly to the email or choose another communication method, such as a text or voice message, to return a recommendation. The server system maintains a list of any pending requests for recommendations for each user. When a user logs onto the server system, the server system notifies the user about whether there are any pending requests for recommendations. In some implementations, the user can submit recommendations through a server system interface (e.g., a graphical user interface provided by the server system to the user on a browser at the user's client device). In some implementations, the server system rewards users who submit recommendations in response to requests for recommendation within the predetermined time.

In some implementations, if one or more recommendations have been received from recommending users, the server system selects at least one of the recommendations to forward to the requesting user. In some implementations, the server system selects the recommendation from the user with the highest trust level. In other implementations, the server system selects at least one recommendation to send to the requesting user based on a number factors, including but not limited to, the overall popularity of the recommended items, the recommendation history of the recommending user, the brand preferences of the requesting user, and the price preferences of the requesting user. In some implementations, the server system requests a large number of recommendations in response to a request (e.g., more than would normally be needed to fulfill a request for recommendations) and uses the extra recommendations to build a database of user recommendations.

In some implementations, when the predetermined amount of time has passed, in accordance with a determination that no users have responded to the request for recommendations, the server system selects additional users to whom it sends a request for a recommendation. In some embodiments, additional requests are sent out before the predetermined amount of time has expired.

In some implementations, the server system identifies a list of previously received recommendations in the requested category. The server system ranks the list of previously received recommendations based on a number of factors, including but not limited to, the trust level the requesting user has for the user who submitted the recommendation, the brand and price preferences of the user, the overall popularity of the item, how long ago the recommendation was made, and how other users have responded to the recommendation. For example, if after four hours no recommendations have been received from the users who had been contacted by the server system, the server system can choose another set of potential recommending users and/or review previously recommended items in the relevant category for appropriate recommendations for the user. In this way, the server system can guarantee recommendations within the time frame requested by the user.

In accordance with some implementations, the server system sends one or more recommendations to the requesting user. The requesting user may respond to the recommendation with a purchasing intent indication. In response to receiving a purchase intent indication from the requesting user, the server system purchases the recommended product on behalf of the requesting user. In some implementations, the server system does not purchase the product or service on behalf of a user. Instead, the server system facilitates a product purchase with a third-party and sends the user a link or other information to allow the user to purchase the goods or services themselves. In other implementations, employees associated with the server system manually purchase the product or service and arrange for delivery to the user. In some implementations, the server system monitors the requesting user's purchasing decisions. When the requesting user purchases a recommended product, the server system responds by increasing the trust level between the requesting user and the recommending user who supplied the recommendation. Consider an example in which Bob recommends a particular smart phone to Alice. If Alice buys the smart phone based on Bob's recommendation, the server system will increase the trust level from Alice to Bob. As noted above, in some implementations, Alice's trust level for Bob will not be increased but Bob's overall trustworthiness score is increased. In the same or different embodiments, if Alice subsequently returns the product because she did not like the product, the server system will decrease the trust level from Alice to Bob back to the previous level or to a lower level, and/or Bob's overall trustworthiness score is decreased to his previous level or to a lower level.

In some implementations, the user can rate the purchased product. In some embodiments, when a user rating of a purchased product is identified, the server system uses that information to update trust information. For example, if Alice submits a good review of the smart phone she purchased, the server system will both update Alice's product preferences and also increase her trust level for the user who recommended the smart phone. However, if Alice submits a bad review for the smart phone she purchased, the server system will decrease her trust level for the user who submitted the recommendation, and/or the server system will decrease the overall trust level for the user who submitted the recommendation.

In some implementations, the user that supplied the recommendation is rewarded by the server system and the overall influence ranking of the user increases for the category of the recommended product. Consider an example in which Jim requests recommendations for a new laptop. The server system determines the top 10 potential recommending users and sends them each an email notifying them of the requested recommendation. Dwight, Pam, and Michael all respond with laptop recommendations. Of the three recommendations, the server system selects Pam's and Dwight's recommendations as being the most relevant and forwards those recommendations to Jim. Jim responds by indicating he would like to purchase the laptop recommended by Dwight. As a result, the server system increase Jim's trust level for Dwight in the category of laptops and increases Dwight's trustworthiness score in that category as well. In some implementations, Dwight also receives a reward/compensation from the server system. In some implementations, a recommending user receives a reward/compensation from the merchant who sold the item. In some implementation, the reward is monetary. In some implementations, the reward includes loyalty program points (e.g., the user is rewarded with miles for an airline's frequent flier program) and/or from the requesting user who purchase the product or service based on the recommendation of the recommending user.

In some implementations, the server system prepares recommendations for users without a direct request from the user. When the user interacts with the service provided by the server system, such as visiting the webpage associated with the server system, the server system presents one or more recommendations to the user. In some implementations, the server system first determines one or more categories of interest to the user visiting the web page. The server system determines categories of interest to the user by information stored in the user's profile concerning, among other things, buying patterns, recent requests, searches, viewing history, brand preferences, time and date information, information stored about the other users connected to the user, prior product reviews by the user, prior professional reviews by third-parties, and overall trends within the community associated with the server system. For example, if a user has recently been searching for "iPhone 5S" and "Samsung Galaxy 3," and a friend whom he trusts has recently purchased a "Nokia Lumia 920," the server system will determine that the user is interested in the category "smart phone."

In accordance with some implementations, the server system determines recommendations for the one or more categories determined to be of interest to the user visiting the webpage. For each category determined to be of interest to the user, the server system identifies recommendations for that category in the trust graph of the user. The server system ranks each identified recommendation based on a trust level associated with the user who made the recommendation, the preferences of the requesting user, the popularity of the product, and opinions of highly influential users, among other criteria. In some implementations, the system identifies all recommendations in a category. In some implementations, the system identifies some recommendations in a category, which can be either a predetermined number or a dynamically changing number of recommendations.

In some implementations, the server system determines a list of recommendations that match a particular category.

The server system retrieves this list from a database of stored recommendations. Once the list has been retrieved, the server system ranks the list of potential recommendations in accordance with trust information stored in the trust graph. In some implementations, the potential recommendations are also ranked in accordance with other factors, such as overall product popularity, price, and user preferences.

In some implementations, the server system displays the recommendations to the requesting user in ranked order from most relevant to least relevant. In some implementations, the displayed recommendations are ranked in accordance with other factors, such as price or product popularity. In some implementations, the server system also displays pictures or symbols representing the recommending users on or near the images representing the recommended items. In some implementations, a requesting user of the server system can request a description of the recommendation source (e.g., a description of why the server system has delivered a specific recommendation to the requesting user). In some implementations, a recommendation from the server system is from a recommending user directly trusted by the requesting user. When the requesting user requests a description of the recommendation source, the server system displays information identifying the recommending user as the source (e.g., the recommending users name and/or a profile picture of the recommending user). For example, if Jake trusts Alan and receives from Alan a recommendation for a pair of shoes, in some implementations, the displayed recommendation includes a displayed recommendation score and a description that includes Alan's name and an indication that Jake directly trusts Alan.

In some implementations, a recommendation is from a recommending user not directly trusted by the requesting user, but for whom the server system has calculated an implicit trust level. In some embodiments, when the requesting user requests a description of the recommendation source, the server system displays an implicit trust chain. The implicit trust chain is a representation of the connections necessary to generate the implicit trust level. For example, when user A directly trusts user B, user B directly trusts user C, and user C directly trusts user D, an implicit trust chain is constructed from user A to user D and is displayed as A→B→C→D. Thus, when a requesting user requests a recommendation source, the server system displays the associated implicit trust chain. In some implementations, more than one possible implicit trust chain exists (more than one path from A to D) and the server displays the shortest implicit trust chain or the trust chain with the highest score.

In some implementations, the server system only displays a portion of the total implicit trust chain. For example, if the implicit trust chain is so long that it cannot easily be displayed, the server system displays only the first and last few connections in the implicit trust chain. In some implementations, the server system displays only the first connection in the implicit trust chain (e.g., a person that the requesting user trusts directly) and a numeric representation of the number of connections (sometimes called the number of degrees) in the chain (e.g., when the trust chain between a user A and a user D is A→B→C→D, user D is said to be a third-degree connection within the user A's trust graph). For example, if Frank receives a recommendation that is the result of a 10 person implicit trust chain that starts with John (e.g., John is directly trusted by Frank), in various embodiments, the system displays all 10 connections, displays the first two and last two connections in the chain, or displays only the identity of John, the first link in the chain (and optionally a number of degrees of the trust chain).

FIG. 1 is a block diagram illustrating a client-server environment 100 for the commerce service in accordance with some implementations. The client-server environment 100 includes one or more client systems 102 (e.g. 102-1 and 102-2), a server system 120, and one or more vendors 160, all connected over one or more networks 110. In some implementations, the client system 102 includes one or more client applications 104 and a display 106. The server system 120 includes a communication module 122, a recommendation request module 124, a user interface module 126, a purchasing module 128, and a trust calculation module 130, a product database 140, a recommendation database 142, and a user profile database 150. The network 110 may be any of a variety of networks, including local area networks (LAN), wide area networks (WAN), wireless networks, wired networks, an intranet, the Internet, or a combination of such networks.

In accordance with some implementations, the one or more client applications 104 include, but are not limited to, a web browsing application (e.g., a web browser) for connecting to the server system 120.

In some implementations, the display 106 is integrated directly into the client system 102 (e.g., as is the case with client system 102-1, which can be a laptop, smart phone, tablet computer, smart television, or the like). In other implementations the device is connected to, but not integrated into, the client system (e.g., as is the case with client system 102-2, which can be a desktop computer that connects to a stand-alone display either wirelessly or otherwise).

In some implementations, the client system 102 sends a trust indication 114 to the server system 120. The trust indication 114 identifies a requesting user of a plurality of users registered with the server system 120, a recommending user of the plurality of users registered with the server system 120, and a trust level from the requesting user to the recommending user. In some implementations, the indicated trust level is represented by a numerical value between 0 and 1, with 0 indicating no trust and 1 indicating maximum trust. In other implementations, the trust level is represented by a numerical value between −1 and 1, wherein 1 indicates maximum trust, −1 indicates maximum distrust, and 0 indicates no current trust information. For example, the client system 102 calls a function such as Trust(A, B) which establishes trust from user A to user B. A more sophisticated trust function would include the product category and would be invoked by calling Trust(A, B, Category) to establish a trust from user A to user B with regard to a given category.

In some implementations, user functions are unique to each user and include a trust level. For example a trust function associated with user A and including a trust level is Trust A(B, "Shoes", 0.5). The server system 120 uses the received trust indication 114 to build a trust graph associated with the requesting user.

In some implementations, the client system 102 sends the server system a recommendation request 112 for a product (e.g., goods or services). In some embodiments, the recommendation request 112 is from a requesting user associated with the client system 102 and indicates a category of goods or services for which the requesting user would like a recommendation. In some implementations, the server system 120 uses trust information stored in the requesting user's trust graph to identify one or more potential recommending users from the plurality of users associated with the server system 120. In some implementations, the server system 120 sends requests to the client system 102 of a recommending user registered with the server system 120 for appropriate recommendations in response to the request. The client system 102 of the recommending user receives the server system 120's recommendation requests 112.

In some implementations, the recommending user responds to the recommendation request 112 by selecting goods or services to recommend. The client system 102 of the recommending user then transmits a recommendation 118 (e.g., product recommendations) to the server system 120. The recommendation 118 sent from the client system 102 of the recommending user to the server system 120 is a recommendation for a product in the same category as originally requested by the requesting user. The server system 120 receives one or more recommendations 118 and determines one or more recommendations 118 to send to the requesting user.

In some implementations, the client system 102 of the requesting user receives one or more recommendations 118 from the server system 120. The client system 120 of the requesting user displays the one or more recommendations 118 to the requesting user. In some implementations, when the requesting user selects one of the displayed recommendations 118, the client system 102 transmits a purchase decision 116 to the server system 120.

In accordance with some implementations, the server system 120 includes a communication module 122, a recommendation request module 124, a user interface module 126, a purchasing module 128, a trust calculation module 130, a product database 140, a recommendation database 142, and a user profile database 150. The communication module is configured to send and receive communication over the network 110 to one or more client systems 102 and one or more vendors 160.

In accordance with some implementations, the recommendation request module 124 is configured to receive a recommendation request 112 from a client system 102. The recommendation request 112 includes information identifying the requesting user, the category of product or services for which a recommendation is desired, a time frame for receiving a recommendation, a price range for the recommended product, a number of desired recommendations, and any other parameters specified by the requesting user. The recommendation request module 124 uses the data included in the recommendation request 112 to determine a list of one or more potential recommending users from the plurality of users.

In some implementations, the recommendation request module 124 determines a list of potential recommending users by analyzing the trust graph of the requesting user to identify users whom the requesting user trusts in the requested category. The list of potential recommending users includes a determined number of recommending users. In some implementations, the determined number of recommending users is predetermined by the server system 120. In other implementations, the determined number of recommending users is determined by the recommendation request 112 of the requesting user. In yet other implementations, the determined number of recommending users is determined dynamically based on the number of suitable candidates, the number of recommendation requests 112 received from the particular requester, and the category of product requested.

In some implementations, the recommendation request module 124 identifies the users directly trusted by the requesting user and selects the users most highly trusted, either generally or in the specific category requested. If there are not enough directly trusted users identified, the recommendation request module 124 requests that the trust calculation module 130 calculate indirect trust with users for whom the requesting user may have transitive trust or conveyed trust. Transitive trust is determined by inferring at least some trust on the part of a requesting user based on the trust relationships of the users trusted by the requesting user. Transitive trust is discussed in more detail below.

In some implementations, the directly trusted users and the indirectly trusted users may be insufficient to reach the number of potential recommending users required. In some implementations, the recommendation request module 124 also includes users who are "highly influential" in the requested category. In some implementations, the server system 120 removes users from the list of potential recommending users to avoid flooding certain users with an unreasonable amount of recommendation requests from the server system 120. By limiting the number of recommendation requests to any particular user, the server system 120 avoids flooding or burning out the recommending user. In some implementations, users are able to determine the frequency at which they receive requests for recommendations. For example, a user can establish that he or she will receive no more than two recommendations per month.

In some implementations, the recommendation request module 124 employs the communication module 122 to send a recommendation request 112 to each user in the identified list of potential recommending users. The communication module 122 then receives recommendations from one or more client systems 102 associated with one or more users in the identified list of potential recommenders. The recommendation request module 124 then selects one or more of the received recommendations to send to the client system 102 of the requesting user.

In some implementations, the user interface module 126 is configured to arrange a web page associated with the server system 120 such that, when requested by a client system 102 associated with a user, the web page includes recommendations customized to the requesting user. The user interface module 126 determines categories of interest to the user based on the user's profile, previous purchases, search history, viewing history, prior product reviews, prior product recommendations, and user profiles of users they trust, among other factors. The user interface module 126 determines recommendations for one or more of the determined categories by identifying recommendations made by users trusted (e.g., by the requesting user) with respect to those categories. In some implementations, the identified recommendations are combined with traditional search results. Any method of searching products in response to a search query can be used to produce traditional search results.

In some implementations, the user interface module 126 ranks the recommendations by the trust level the requesting user has with the recommending user (either direct or indirect trust), the overall popularity of the product recommended, the amount of time passed since the time the recommendation was made, professional reviews, prior purchasing decisions, prior product reviews, prior recommendations, and other factors included in the requesting user's preferences, such as price, size, color, materials, features, product availability, shipping preferences, and/or brand. The user interface module 126 configures the web page to display categories ranked in order of determined interest to the requesting user, with higher ranked categories being of more interest than lower ranked categories.

In some implementations, the user interface module 126 orders recommendations within a particular category on the web page by the predicted interest of the user such that the higher a product is ranked in accordance with the predicted interest of the user, the sooner the recommendation is displayed. In some implementations, products receive a ranking score based on predicted interest of the user and are ordered based on the ranking score. In some implementations, the user interface module 126 configures the web page to display the recommendations as an image of the recommended product. In some implementations, the user interface module 126 includes an image of the recommending user on top of or near the image of the recommended product.

In some implementations, the purchasing module 128 is configured to receive a purchase decision 116 from a client system 102. Based on this message, the purchasing module 128 determines the product to be purchased and identifies the relevant vendor in the products database 140. The purchasing module 128 then enlists the communication module 122 to purchase the desired product from one of the vendors 160 available over the network 110.

In some implementations, the trust calculation module 130 is configured to build and maintain trust graphs for each user registered with the server system 120. In some implementations, the trust calculation module 130 receives a trust indication 114 from a client system 102 associated with a requesting user. The trust indication 114 includes information identifying the requesting user, a recommending user, and a trust level from the requesting user to the recommending user. As noted above, the trust level is a numeric value indicating the level of trust between the two users. The trust calculation module 130 builds trust graphs by collecting a plurality of trust indications 114 for each user registered with the server system 120.

In some implementations, the trust calculation module 130 updates a requesting user's trust graph based on the requesting user's interactions with the server system 120, interactions with others, and purchasing decisions. For example, if a requesting user buys a product that has been recommended by a recommending user, the trust calculation module 130 will infer that the requesting user trusts the recommending user and will increase the trust level to reflect the inference of greater trust.

In some implementations, the product database 140 contains information for products that may be purchased through the server system 120. In some implementations, the products in the product database 140 are added by vendors 160 (who may be partnered with the service provided by the server system). In some implementations, the products in the database 140 are added by users and recommenders in the server system 120. The products database 140 includes information for each product, including, but not limited to, the price of the product, its specification (e.g., size, color), shipping options/price, and the vendor(s) 160 from which it is available. In some implementations, the client system 102 sends a purchase decision 116 to the server system 120 and the purchasing module uses the information stored in the product database 140 to purchase the selected product.

In some implementations, the recommendation database 142 stores recommendations received from users of the server system 120. In some implementations, the recommendation database maintains a list of all recommendations ever made by any users of the database, an indication of how successful those recommendations were (e.g., what percentage of users purchased the recommended product when given this recommendation), and information concerning the request for recommendation that prompted the recommendation. In other implementations, only a portion of the total recommendations are retained in the recommendation database 142 at any given time, e.g., based on how long ago the recommendation was made, whether the product is still available, the trustworthiness of the recommending user, how popular the recommendation has been, etc.

In some implementations, the recommendation request module 124 receives a recommendation request 112 from a user. In response, the recommendation request module 124 queries the recommendation database for any stored recommendations that meet the requested criteria. The recommendation database 142 then returns a list of potential recommendations to the recommendation request module 124. The recommendation request module then orders the potential recommendations by the trust level of the requesting user for the recommending user. The server system 120 selects a predetermined number of recommendations from the top of the ordered list and displays the selected recommendations to the requesting user. In some implementations, the server system 120 allows the user to navigate through the ordered list to view recommendations that were not initially selected by the server system 120. For example, in some implementations, the server system 120 provides affordances (e.g., a scroll bar, a "next" button) through which the user can navigate through the ordered list. In some embodiments, server system 120 displays a scrollable list of recommendations from recommendation database 142 to the requesting.

In some implementations, the user profile database 150 contains user profiles for users who have registered to use the service provided by the server system 120. In some implementations, a user profile includes a user's name, contact information, identification, demographic information (e.g., gender, age, location), purchasing history, shipping preferences, social network information, and trust information. The user profile database 150 includes trust graph data 152.

In some embodiments, the user profile 150 includes an indication signifying whether the user is "burnt-out," meaning that no further recommendation requests should be asked of her until she is no longer "burnt-out." In some embodiments, the user is identified as burnt-out when the user has received a predefined number of recommendations request with a predefined amount of time (e.g., two requests within the past 24 hours). In some embodiments, the user can self-identify as burnt-out by setting a "burnt-out" status in her own user profile 150, in which case the system will not request recommendations as long as the user maintains the burnt-out status.

In some implementations, user profile information 150 also includes the trust graph database 152 includes information describing a plurality of directed trust graph. In some embodiments, trust graph database 152 includes a trust graph for each of the users who have registered to use the commerce service provided by server system 120. The trust graph includes nodes, which represent users, and edges connecting nodes, which represent the trust level between the two users represented by the two nodes that the edge connects.

In some implementations, the vendors 160 are commercial organizations with products to sell. In some embodiments, the vendors 160 receive product orders from the server system 120 and fulfill those orders.

Figure 2:
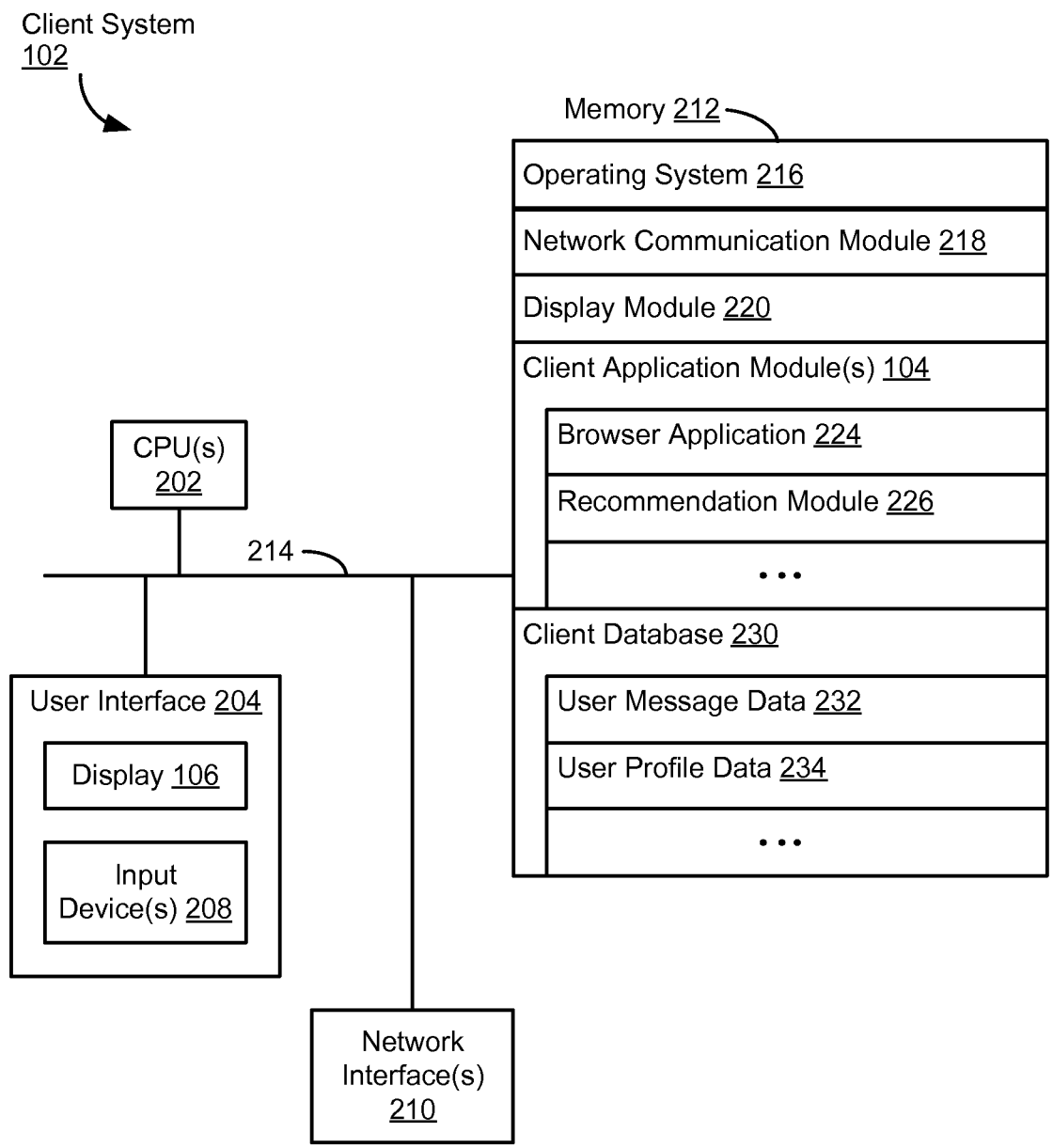
FIG. 2 is a block diagram illustrating a client system in accordance with some embodiments.

FIG. 2 is a block diagram illustrating a client system 102, in accordance with some implementations. The client system 102 typically includes one or more processing units or cores (collectively "CPUs") 202, one or more network interfaces 210, memory 212, and one or more communication buses 214 for interconnecting these components. The client system 102 includes a user interface 204. The user interface 204 includes an associated display device 104 and optionally includes an input means such as a keyboard, mouse, a touch sensitive display, or other input buttons 208. Optionally, the display device 106 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of media on a display 106 associated with the client system 102;
- one or more client applications module(s) 104 for enabling the client system 102 to perform the functions offered by the client system 102, including but not limited to:
  - a browser application 224 (or another local application, such as a mobile application or mobile "app") for sending requests to a server system (FIG. 1, 120) and displaying the information (for example web pages) returned by the server system (FIG. 1, 120) or a smart phone app that performs the same function;
  - a recommendation module 226 for enabling a user to send a recommendation requests to a server system (FIG. 1, 120), receiving a message requesting a recommendation from another user from the server system (FIG. 1, 120), and to select a goods or services to recommend to another user and transmit the recommendation information to the server system (FIG. 1, 120); and
- a client data 230 for storing data (e.g., in a database) related to the client system 102, including but not limited to:
  - client message data 232, including data representing messages to be sent to the server system (FIG. 1, 120) and messages received from the server system (FIG. 1, 120); and
  - user profile data 234, including information concerning users of the client system 102 such as a user profile, user preferences and interests, and other information relevant to providing services to the user. In some embodiments, the information can comprise the user's name and contact information, identification, demographic information (e.g., gender, age, location, etc), user history (e.g., previous purchases, searches, page views, previous product recommendations, previous product reviews, and so on), social network information, trust information, shipping preferences, personal measurements.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 212, optionally, stores a subset of the modules and data structures identified above. Furthermore, memory 212, optionally, stores additional modules and data structures not described above.

Figure 3:
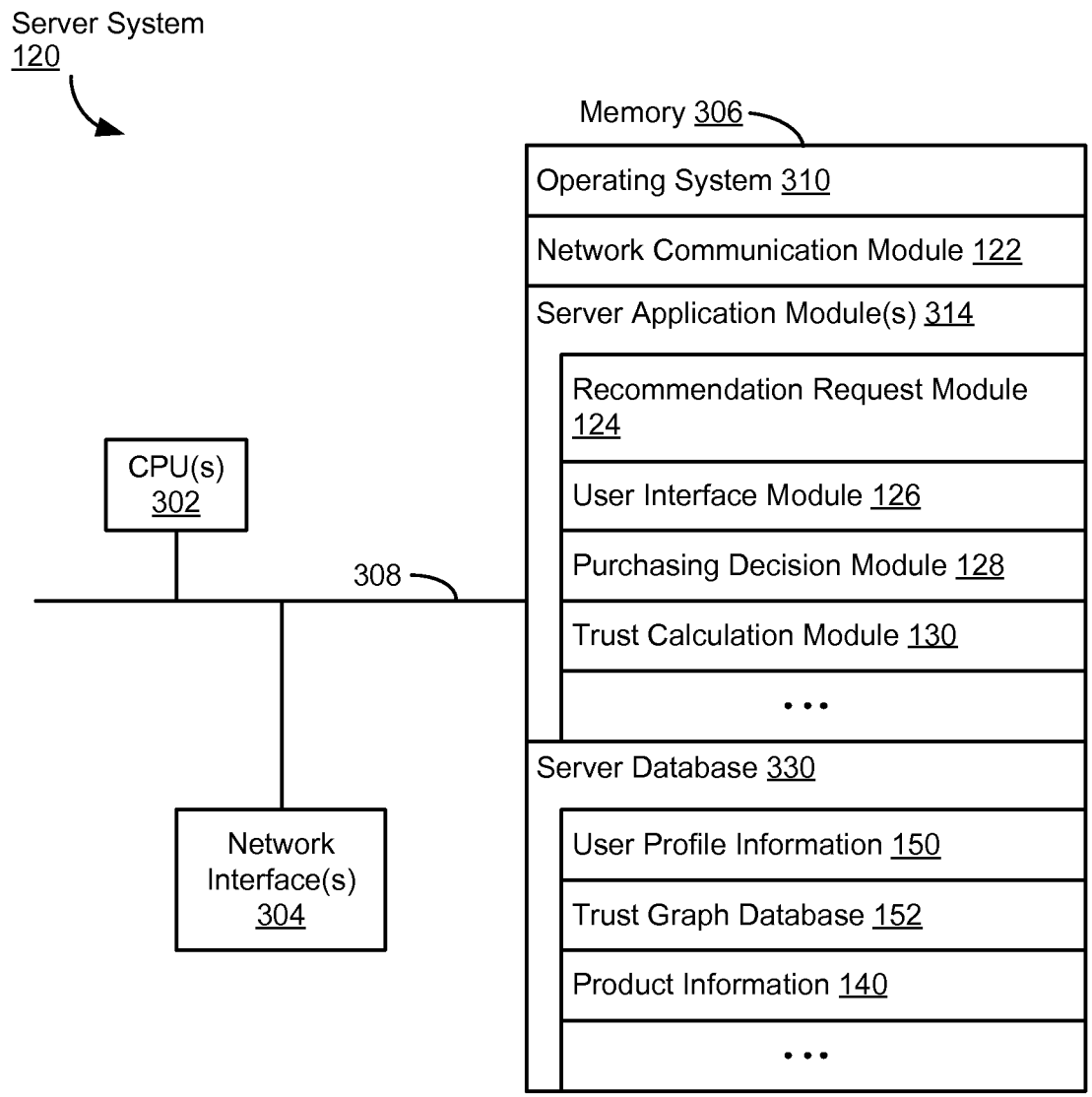
FIG. 3 is a block diagram illustrating a server system in accordance with some embodiments.

FIG. 3 is a block diagram illustrating a server system 120, in accordance with some implementations. The server system 120 typically includes one or more processing units or cores, CPUs 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 122 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 314 for enabling the server system 120 to perform the functions offered by the server system 120, including but not limited to:
  - a recommendation request module 124 for receiving a recommendation request from a requesting user, determining potential recommending users using the trust graph information associated with the requesting user, sending a request for recommendations to the determined potential recommending users, receiving one or more recommendations from the determined potential recommending users, and sending one or more of the received recommendations to the requesting user;
  - a user interface module 126 for configuring the information displayed at the client system when the client system (FIG. 1, 102) requests a web page from the server system 120;
  - a purchasing decision module 128 for receiving a purchasing decision 116 from a client system (FIG. 1, 102) that indicates a user's intention to purchase a goods or services through the server system and for purchasing the goods or services from one of the vendors (FIG. 1, 160); and a trust calculation module 130 for storing trust indications received from client systems (FIG. 1, 102), using the stored trust indications to build a directed trust graph, and identifying the trust level between two users based on the stored trust data; and one or more server data module(s) 330 for storing data related to the server system 120, including but not limited to:

user profile information database 150 including user personal information, preferences and interests, user history, including past user purchases, searches, page views, previous product recommendations, previous product reviews, and social connections of the user;

trust graph information 152 including information describing trust between users of the server system 120 including data indicating the categories in which users trust each other; and product information 140 including information contains information for products that may be purchased through the server system 120, including, but not limited to, the price of the product, its features (size, color, etc), and the vendor or vendors from which it is available.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 306, optionally, stores a subset of the modules and data structures identified above. Furthermore, memory 306, optionally, stores additional modules and data structures not described above.

Figure 4:
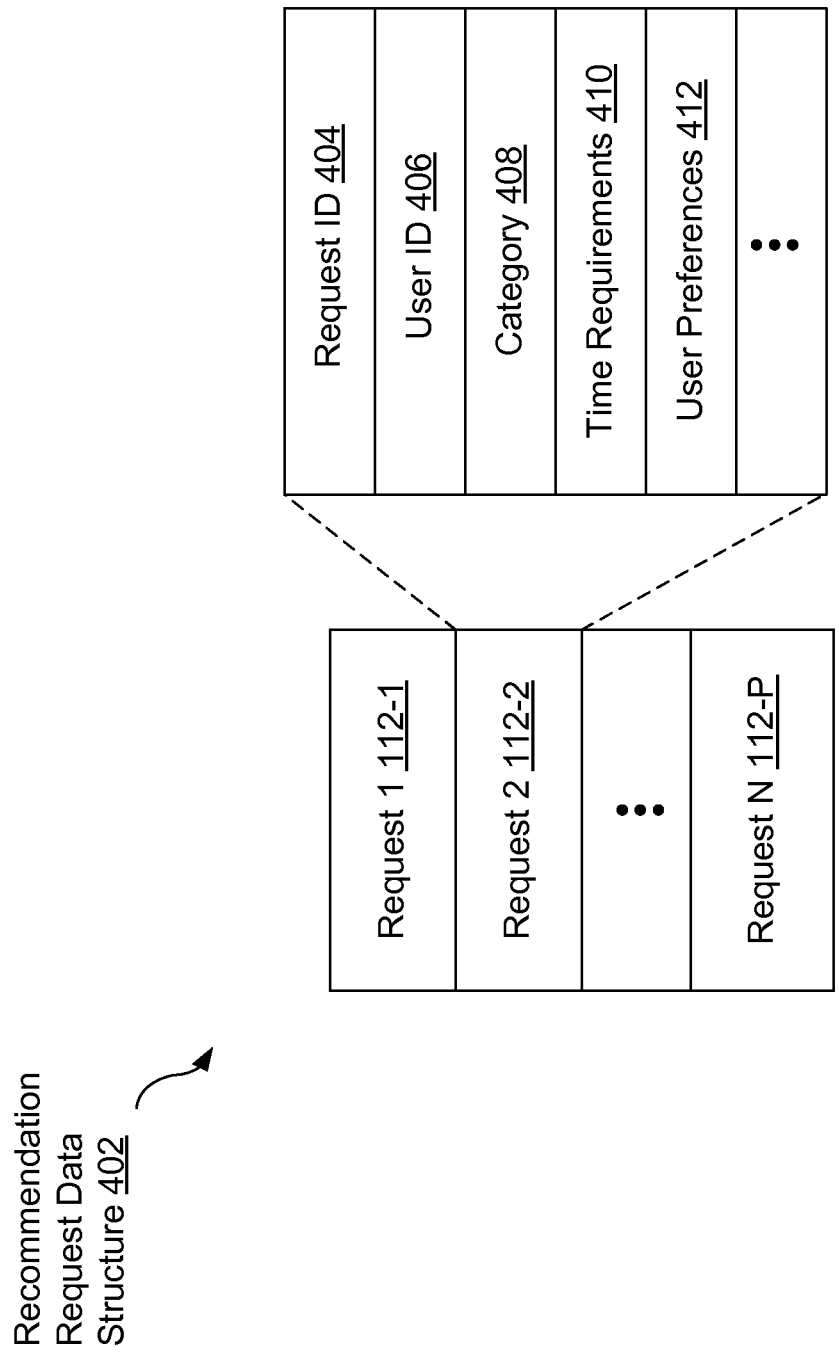
FIG. 4 illustrates a block diagram of an exemplary data structure for a recommendation request for requesting a recommendation from the server system in accordance with some embodiments.

FIG. 4 depicts a block diagram of an exemplary recommendation request data structure 402 for storing recommendation requests 112 for requesting a recommendation from the server system (FIG. 1, 120). In accordance with some implementations, the recommendation request module 124 stores a plurality of recommendation requests 112-1 through 112-P in the recommendation data structure 402. Each recommendation request 112 corresponds to a user-submitted recommendation request. In some implementations, each recommendation request 112 contains a request ID 404 that identifies a particular recommendation request 112, a user ID 406 of the user submitting the request, a category 408 of the product requested, one or more time requirements 410 of the request, and user preferences 412 for the product features.

In some implementations, the category 408 includes the category of product for which the user requests a recommendation. The category 408 includes at least one category from the list of possible categories associated with the server system (FIG. 1, 120). For example, the category 408 may be narrow (e.g., such as Nokia brand smart phones) or broad (e.g., such as men's athletic shoes).

In some implementations, the time requirements 410 describe the time parameters during which the requesting user would like a recommendation. For example, a user might request a recommendation within 24 hours. In some implementations, the time requirements 410 include a default time parameter (e.g., 48 hours) that is used when the user does not specify a time requirement. In some implementations, a recommendation request also includes user preferences 412 regarding the product recommendations. In some implementations, user preferences 412 include any criteria by which potential requests can be distinguished, including the price range specified by the user, brands or vendors favored by the user, colors, styles, size of the product, options included with the product, quantity of the product available, material used to fabricate the product, the number of units, the pattern of the product design, whether the product is local, the level of service associated with the product, whether the vender allows custom modifications, whether the vendor allows special requests of any kind, whether the product comes with a warranty, the assembly status of the product (for example, pre-assembled, partially assembled, or unassembled), the artist or maker associated with the product, the format of the product, the version of the product, whether the price of the product has been reduced as part of a sale, whether the product has been discontinued, and any other feature or characteristic that the user desires for the requested recommendation.

In some implementations, the user preferences 412 can include preferences for delivery options such as the speed of delivery, the cost of delivery, prepaid shipping, the delivery provider, the delivery service provider, delivery insurance availability, the delivery period, white glove delivery options, in-store pick-up options, method of delivery (electronic or physical), the return policy, and the pre-order policy, or any other delivery option that may be preferred by a user.

In some implementations, the user preferences 412 include gift options such as the availability to ship to multiple addresses, whether the product can be gift-wrapped, whether a gift note or card can be included, and whether a gift receipt is available. In some implementations, one or more of the user preferences 412 are mandatory for certain categories of products.

Figure 5:
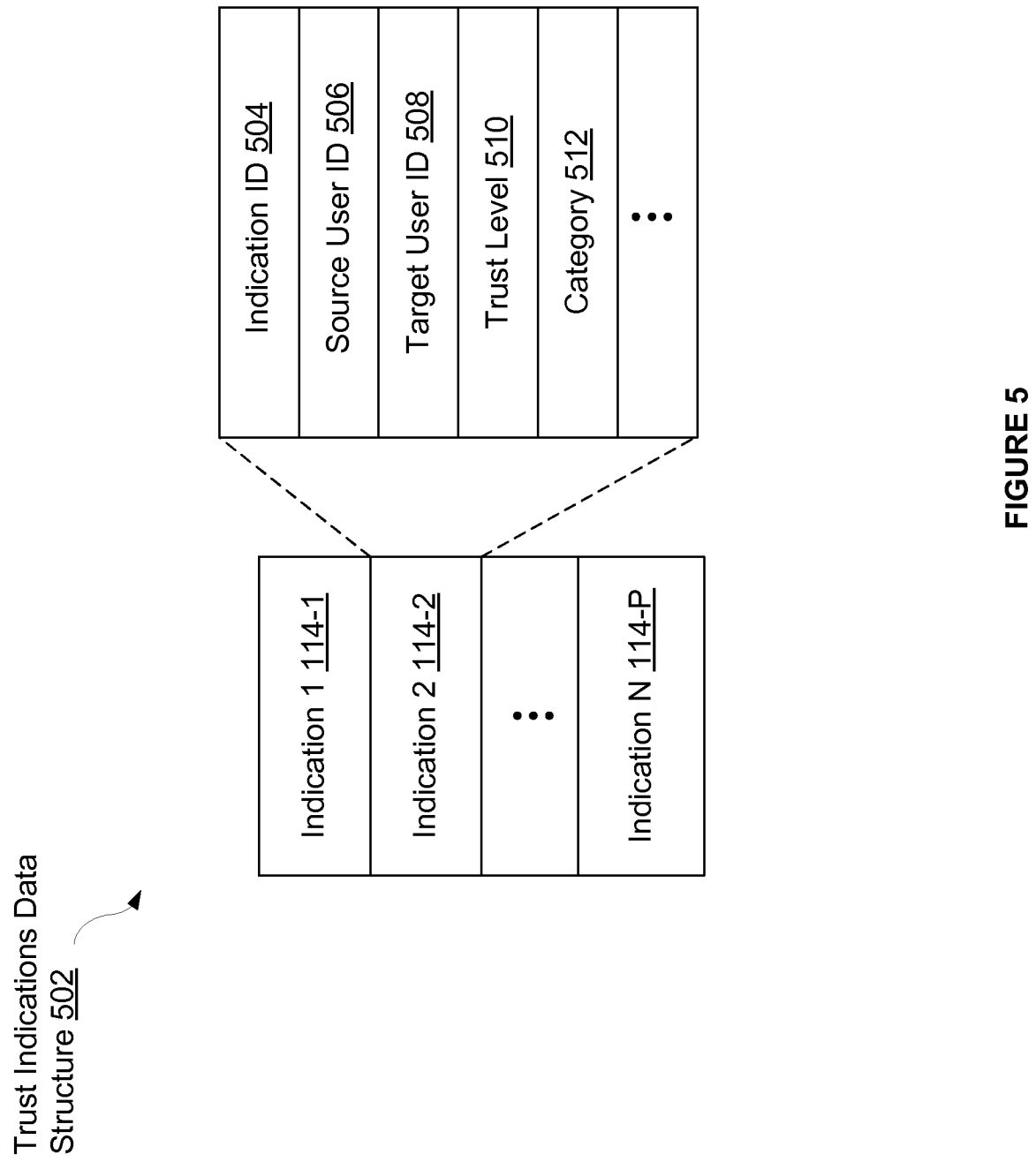
FIG. 5 illustrates a block diagram of an exemplary data structure for a trust indication that is sent to the server system to build a trust graph for each user in accordance with some embodiments.

FIG. 5 depicts a block diagram of an exemplary trust indication data structure 502 for trust indications 114 that are sent to the server system (FIG. 1, 120) to build a trust graph for each user. As an example, trust indication data structure 502 can be part of user profile information 150 (FIG. 1) and/or trust graph database 152 (FIG. 1). In accordance with some implementations, the trust indication data structure includes one or more (or a plurality of) trust indications 114-1 to 114-P, each of which corresponds to a user-submitted trust indication. In some implementations, each trust indication 114 includes an indication identification (ID) 504 that identifies a particular trust indication 114, a source user identification 506 of the user submitting the trust indication 114 (e.g., a requesting), the target user identification (ID) 508 representing the ID of the user for whom the trust indication 114 is submitted (e.g., a recommending user), a trust level 510 representing the amount of trust from the requesting user (e.g., the user identified by source user ID 506) has for the recommending user (e.g., the user identified by the target user ID 508), and the category 512 to which the trust applies. For example, the requesting user (Alice) might trust a recommending user (Bob) in the category of electronic cameras. The trust indication would include Alice, Bob, a numerical representation of the level of trust Alice has for Bob, and the category of electronic camera.

Figure 6:
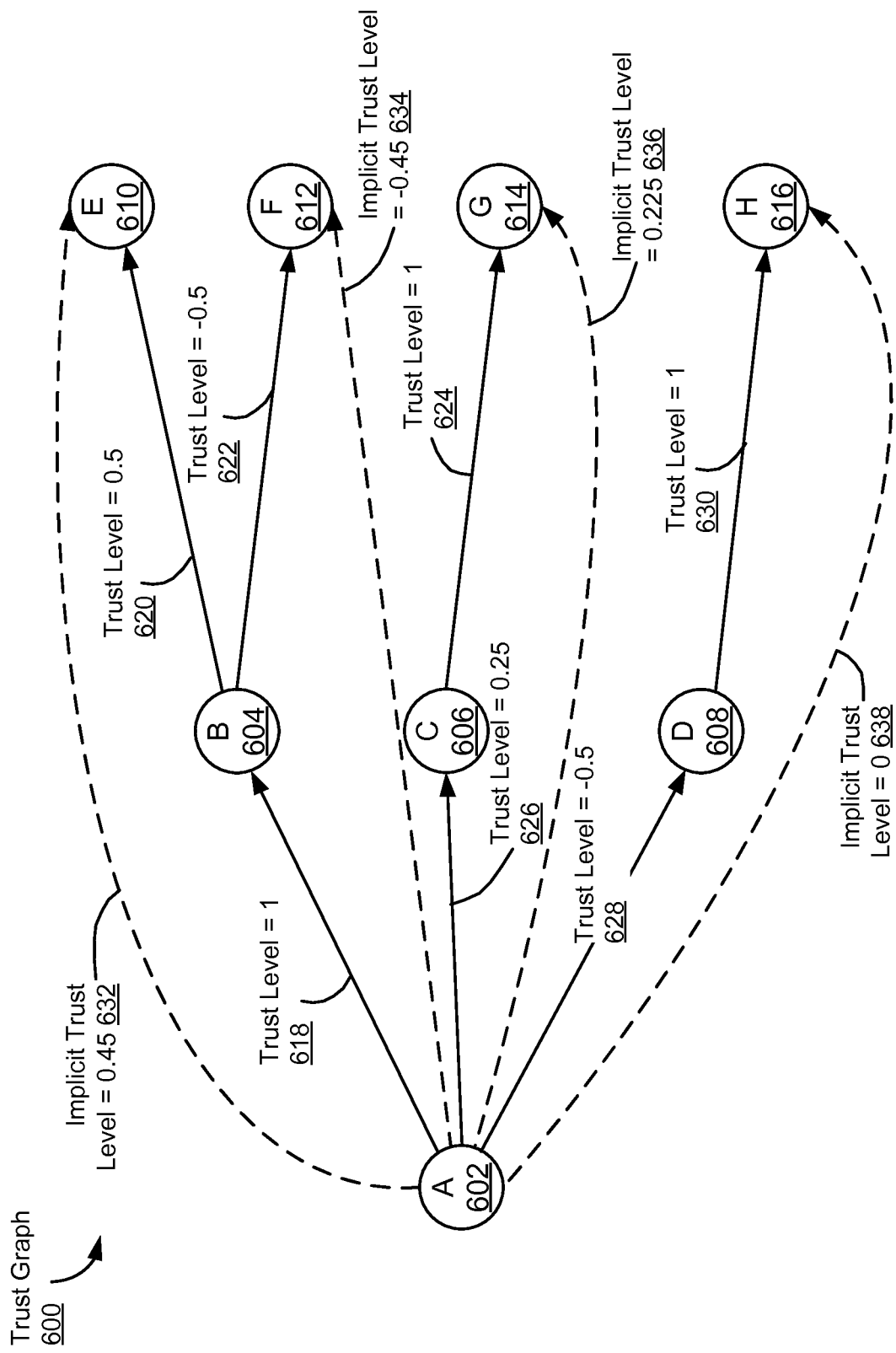
FIG. 6 illustrates a block diagram of an exemplary trust graph associated with a user in accordance with some embodiments.

FIG. 6 depicts a block diagram of an exemplary trust graph 600 associated with a requesting user. In some implementations, a directed trust graph for a requesting user A 602 includes a plurality of nodes that represent users and a plurality of edges (connections) between users that represent the trust level between users. Because the trust graph is a directed graph, any particular trust level value only gives information as to the trust that the requesting user has for the recommending user. The trust the recommending user has for the requesting user (e.g., when their roles are swapped) is represented in a separate and distinct trust level from the recommending user (e.g., in his or her role as a requesting user) to the requesting user (e.g., in his or her role as a recommending user). As noted above, the trust level is a numerical value that represents the trust from one user to another. In some implementations, the trust level is a number between −1 and 1 where 1 represents full trust, −1 represents complete distrust, and 0 represents no trust information. In some implementations, each trust level is a number between 0 and 1, with no indication of distrust.

In some implementations, a trust graph displays connections between the requesting user A 602 and users for whom the server system (FIG. 1, 120) has trust information (users B 604, C 606, and D 608). The trust graph includes trust levels between user A 602 and users B 604, C 606, and D 608. In some implementations, the trust graph 600 includes users (E 610, F 612, G 614, and H 616) for whom the trust graph 600 has no direct trust indication from user A 602 but does have direct trust indications from users B 604, C 606, and D 608 for whom the trust graph 600 has direct trust indications from user A. In some implementations, the trust graph 600 calculates implicit trust levels for users that user A has not trusted explicitly but who are trusted by users whom user A has trusted. In some cases, the implicit trust level of user A for user C can be calculated by assigning the level of trust for user C of some intermediate user B to user A. For example, if user A trusts user B and user B trusts user C, the implicit or transitive trust level is calculated for user A to user C.

In some implementations, the trust level of user A to user C is a factor of the amount that user A trusts user B (abbreviated A→B) and user B trusts user C (abbreviated B→C). This is calculated by multiplying the trust level of A→B with the trust level of B→C such that the implicit trust level of B→C: A→C=A→B×B→C. For example, if the trust level of A→B is 0.5 and the trust level of B→C is 0.75, then the trust level of A→C is 0.5×0.75=0.375. In some implementations, the implicit trust levels are discounted by a discount value (e.g., a percentage value) to account for the fact that determining implicit trust is inherently unreliable. Such a discount value might be 10%. For example, if a trust value of 0.375 was calculated using the method above, that value may be discounted by 10% to 0.3375. In some implementations, this implicit trust level calculation can be used to determine an implicit trust level for users through any number of user links. In other implementations, the number of user links is limited. For example, in some embodiments, a server system determines that no trust values are implicitly calculated for users who are more than two links away from the current user.

In the trust graph 600 represented in FIG. 6, the requesting user A has a trust level of 1 (618) for user B 604, a trust level of 0.25 (626) for user C 606, and a trust level of −0.5 (628) for user D 608. User B 604 has a trust level of 0.5 (620) for user E 610 and a trust level −0.5 (622) for user F 612. The trust calculation module (FIG. 1, 130) calculates the implicit trust level 632 for user A 602 by multiplying the trust level from A→B 618 and the trust level 620 from B→E and then discounting the resulting value by 10%. Thus, the implicit trust level 632 from A to E is 1×0.5×0.9=0.45, indicating that there is likely some trust from user A 602 to user B 604. Similarly the implicit trust level 634 from A to user F is 1×(−0.5)×0.9=−0.45, indicating that there is likely some distrust from user A 602 to user F 612. The implicit trust level 636 of A to G is 0.25×1×0.90=0.225.

In some circumstances, there is more than one possible connection path that can be used to generate an implicit trust level. For example, if user A has two different trust levels for user B and user C, and both user B and user C trust user D, the system can use either user B's trust levels or user C's trust level to calculate the implicit trust from user A to user D. In some implementations, the server system (FIG. 1, 120) chooses either the highest or lowest potential implicit trust level. In some implementations, the server system (FIG. 1, 120) averages all the implicit trust levels. In other implementations, the server system (FIG. 1, 120) selects the implicit trust level that includes the fewest connections.

In some implementations, when the user A 602 has a trust level lower than zero for the user D 608, the trust calculation module (FIG. 1, 130) does not use the trust levels of the user D 608 to calculate implicit trust levels. Thus, the implicit trust level 638 of A to H is zero (representing no trust information). In this way no trust information will be inferred through distrusted users. In some implementations, no negative trust values are allowed. In other implementations trust information will be inferred through distrusted users in the same way as it is inferred from trusted users.

Figure 7:
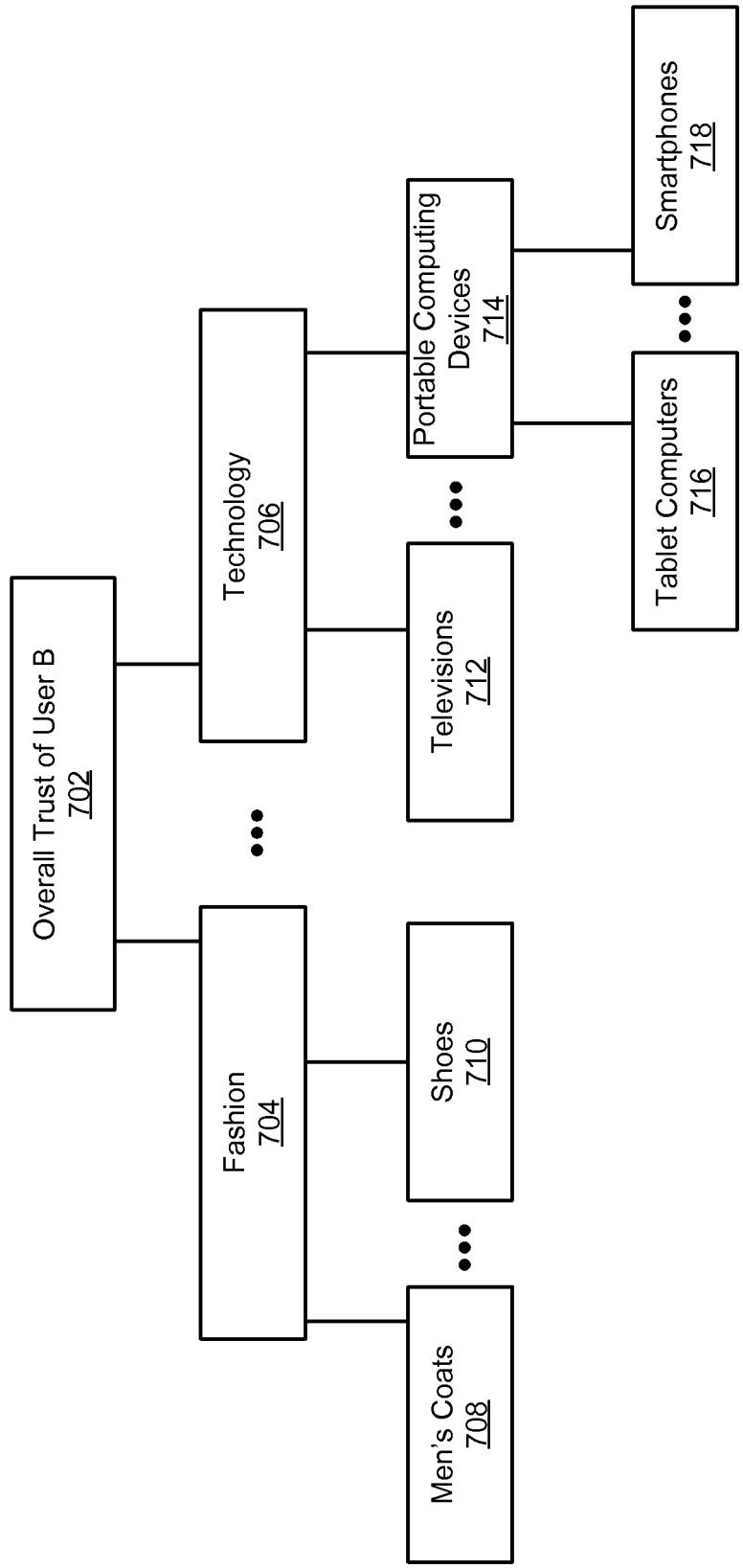
FIG. 7 illustrates a block diagram of an exemplary hierarchical taxonomy of trust categories for recording the trust a respective user has for another user in accordance with some embodiments.

FIG. 7 depicts a block diagram of an exemplary hierarchical trust graph 700 displaying the trust a requesting user has for a recommending user B by category. In some implementations, a requesting user may indicate trust in a recommending user in a particular category of goods or services. In this case, the trust information will be stored in a hierarchical trust graph 700. The hierarchical trust graph stores the overall trust level for a user 702. In some implementations, the overall trust level of the recommending user is set directly by the requesting user through a trust indication (FIG. 1, 114). In other implementations, if the requesting user has not indicated an overall trust level for the recommending user, the overall trust level is determined by propagating trust levels for more general categories higher on the hierarchical trust graph (e.g., parent categories). In some implementations, trust levels are discounted as they are propagated upwards to more general categories. In some embodiments, the trust levels are discounted by a fixed percentage, such as 10%. For example, if user A indicates a trust level in portable computing devices 714 of 0.8 that trust level is propagated upwards to technology 706 with a 10% discount. So the trust level from user A to user B in technology 706 would be set to 0.72. In such embodiments, the trust level is propagated further upward to overall trust of user B 702 and discounted again to a trust level of 0.648.

In some implementations, trust levels are also propagated downwards towards more specific categories (e.g., child categories). In some embodiments, trust levels propagated downwards are not discounted. For example, if user A indicates a trust level of 0.5 for user B in the category of fashion 704, this trust level is propagated downward to all subcategories of fashion 704, including men's coats 708 and shoes 710, at the trust level of 0.5 without any discounting. Alternatively, in some implementations, trust levels propagated downward are also discounted.

In some implementations, when propagating trust levels from narrow sub-levels (e.g., child categories) to broader categories higher in the hierarchical graph, more than one candidate trust level may be identified from narrower sub-categories. For example, if user A has indicated a trust level of 0.9 for smart phones 718 and a trust level of 0.7 for tablet computers 716, the server system (FIG. 1, 120) needs to determine how to use both levels to determine the overall trust level for portable computing devices 714. In determining the trust level of portable computing devices 714, the trust calculation module (FIG. 1, 130) needs to deal with the trust level of both child categories. In some implementations, the trust level of portable computing device 714 uses the higher of the competing trust levels, resulting in a trust level of 0.9. In some implementations, the trust level of portable computing device 714 uses the lower of the two competing trust levels, resulting in a trust level of 0.7. In some implementations, the two competing trust levels are averaged to produce the trust level of the higher category, resulting in a trust level of 0.8.

In some implementations, the system builds and stores a hierarchical trust graph for each user. In other implementations, the system stores category trust information and only builds the hierarchical trust graph when needed.

Figure 8:
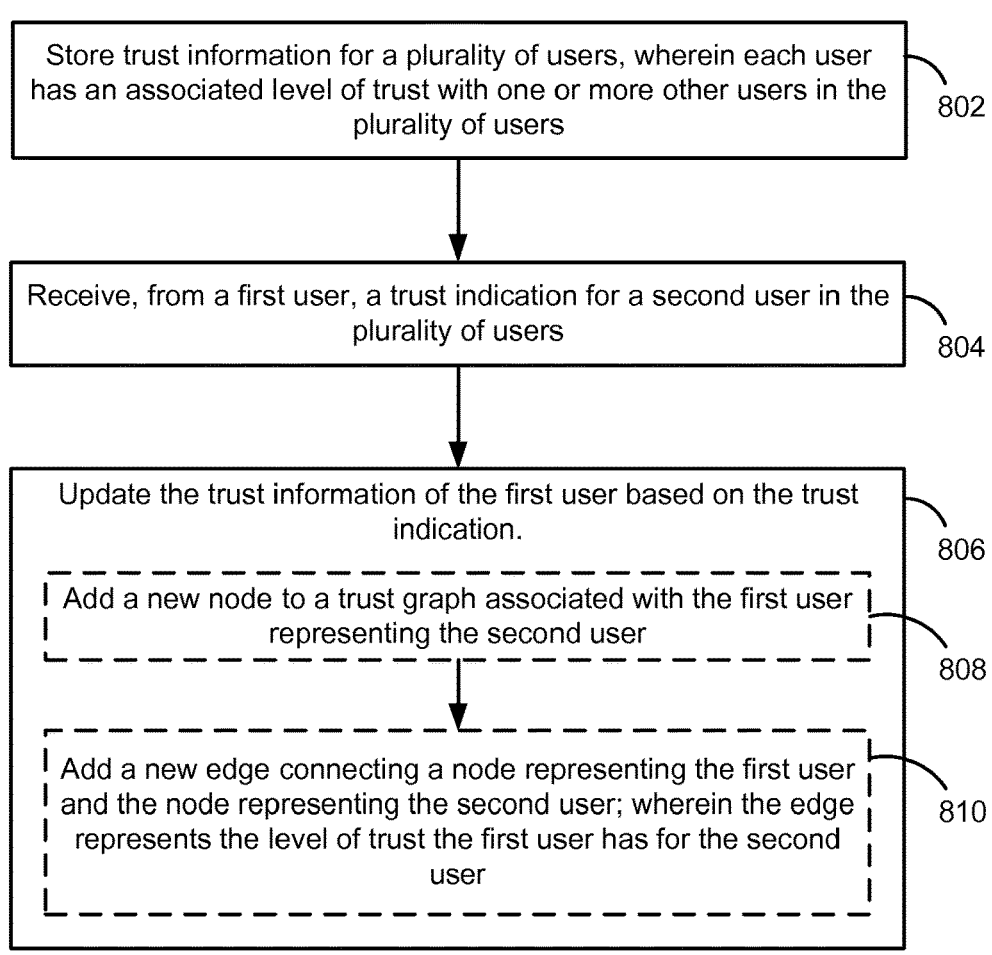
FIG. 8 illustrates a flowchart representation of a method of storing levels of trust between users for use in accordance with some embodiments.

FIG. 8 is a flow diagram illustrating the process for storing levels of trust between users for use in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the server system (FIG. 1, 120).

In accordance with some implementations, the server system (FIG. 1, 102) stores trust information for a plurality of users, wherein each user has an associated level of trust with one or more other users in the plurality of users (802). In some implementations, the trust information is a trust graph representing levels of trust between at least some of the users in the plurality of users.

In some implementations, the trust graphs are directed graphs. In some implementations, the server system (FIG. 1, 102) receives, from a first user, a trust indication for a second user in the plurality of users (804). In some implementations, the trust indication includes a level of trust from the first user to the second user. In some implementations, the trust indication further includes a trust category from a plurality of trust categories in which the first user trusts the second user. In some implementations, the plurality of trust categories is arranged in a hierarchical format.

In accordance with some implementations, the server system (FIG. 1, 102) updates the trust information of the first user based on the trust indication (806). In some implementations, updating trust information includes adding a new node to a graph associated with the first user representing the second user (808). In some implementations, updating trust information further includes adding a new edge connecting a node representing the first user and the node representing the second user; wherein the edge represents the level of trust the first user has for the second user (810).

Figure 9:
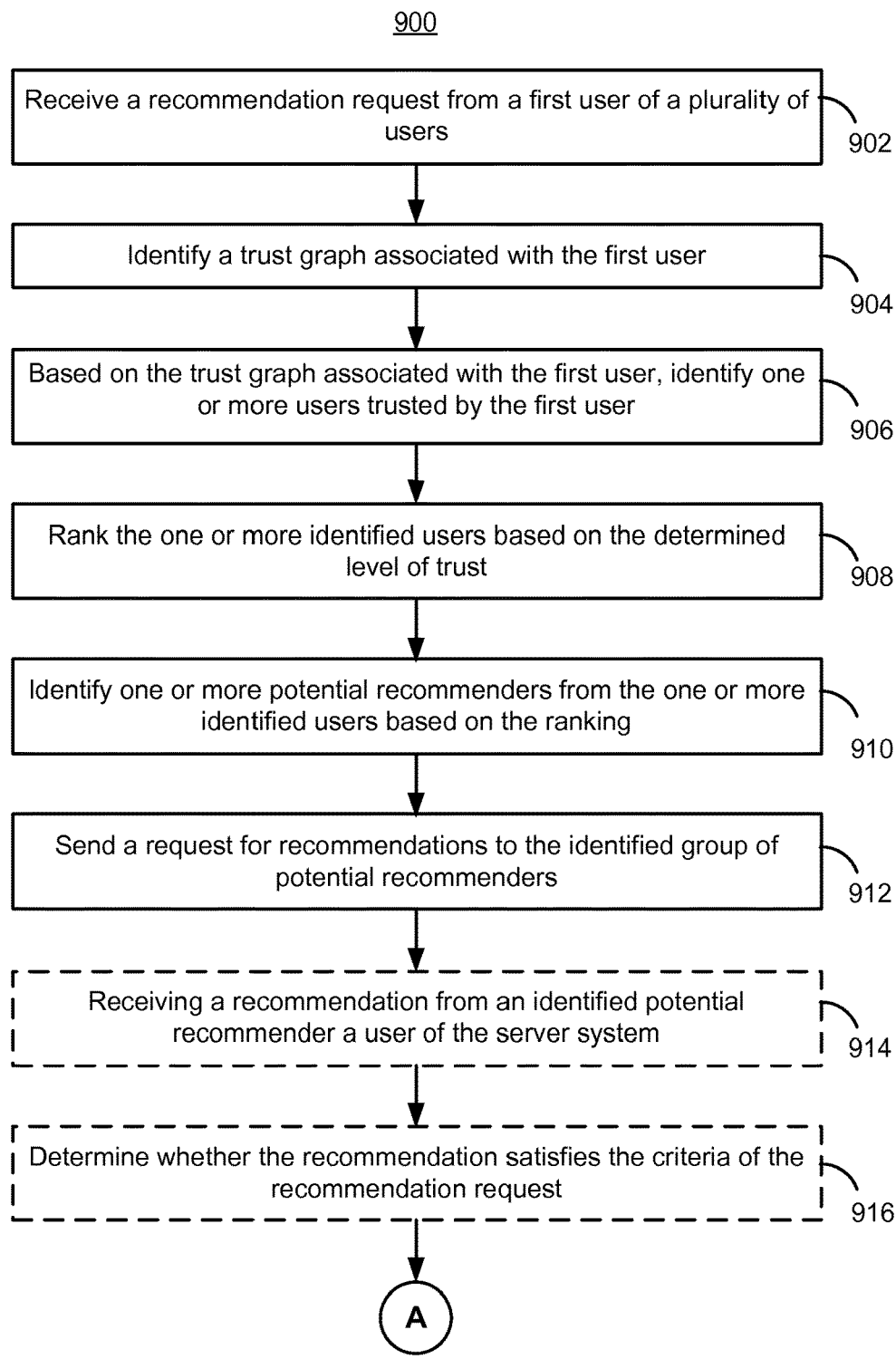
FIG. 9 illustrates a flowchart representation of a method of fulfilling a recommendation request in accordance with some embodiments.

FIG. 9 is a flow diagram illustrating the process for fulfilling a recommendation request in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the server system (FIG. 1, 120).

In accordance with some implementations, the server system (FIG. 1, 120) receives a recommendation request from a first user of a plurality of users (902). In some implementations, the recommendation request includes a category of the product requested. In some implementations, the recommendation request includes one or more criteria for evaluating potential recommendations. The one or more criteria can include at least one of the price, style, brand, size, features, and style of the product. In some implementations, the server system (FIG. 1, 120) identifies a trust graph associated with the first user (904). The server system (FIG. 1, 120) then identifies one or more users trusted by the first user, based on the trust graph associated with the first user (906).

In accordance with some implementations, the server system (FIG. 1, 120) ranks the one or more identified users based on the determined level of trust (908). For example, the server system orders the identified users from highest level of trust to lowest level of trust. The server system (FIG. 1, 120) then identifies one or more potential recommenders from the one or more identified users based on the ranking (910). In some implementations, the identified one or more potential recommenders are selected based on the number of communications the users have recently received from the server system (FIG. 1, 120). In this way, the server system (FIG. 1, 120) avoids flooding or overburdening user with too many recommendation requests. The server system (FIG. 1, 120) sends a request for recommendations to the identified group of potential recommenders (912). In some implementations, requests for recommendations are sent over email or text messages. In other implementations, the requests are sent via a server system (FIG. 1, 120) messaging service. In some implementations, the requests are sent using other messaging services/technologies.

In accordance with some implementations, the server system (FIG. 1, 120) receives a recommendation from an identified potential recommending user of the server system (FIG. 1, 120) (914). The server system (FIG. 1, 120) determines whether the recommendation satisfies the criteria of the recommendation request (916). The server can continue to identify (906) additional users, rank (908) the additional users, identify (910) additional recommenders from the additional users, and/or send (912) additional requests for recommendations to the additional recommenders until the server receives (914) a minimum or sufficient number of recommendations.

Figure 10:
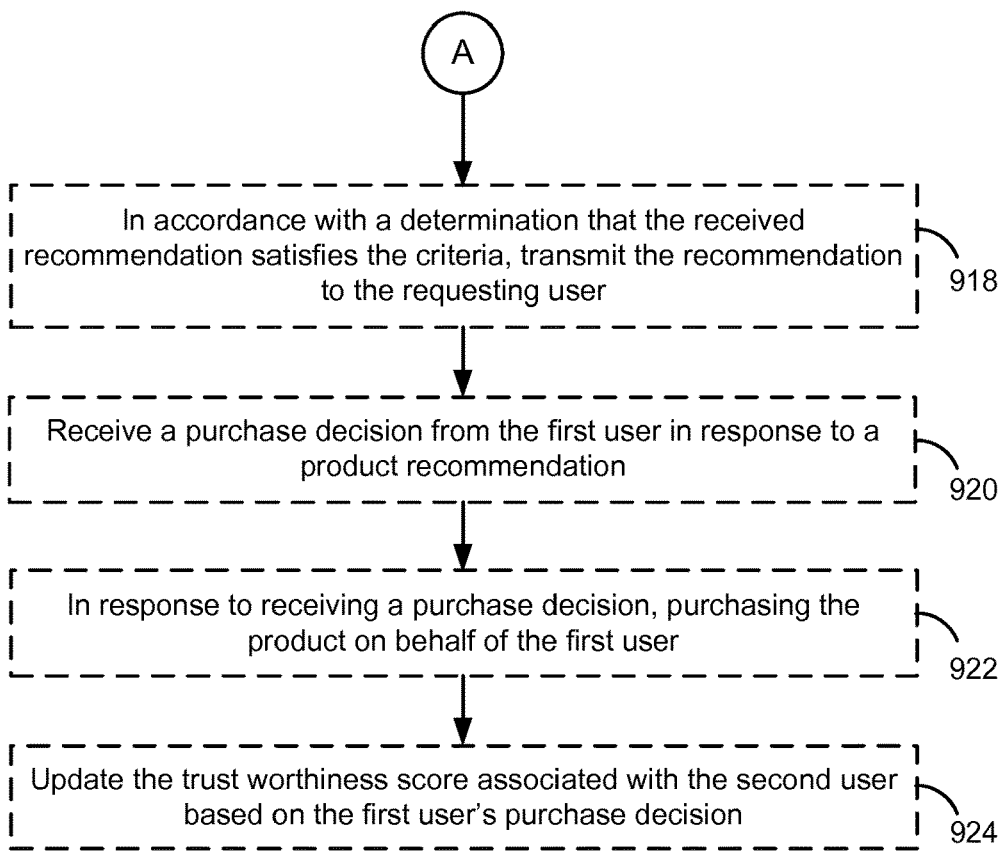
FIG. 10 further illustrates the flowchart representation of the method of fulfilling a recommendation request according to FIG. 9.

FIG. 10 illustrates a continuation of method 900 according to some embodiments. In some embodiments, from point A, in accordance with a determination that the received recommendation satisfies the criteria, the server transmits (918) the recommendation to the first user. The recommendation sent to the first user is sent via one or more communication methods such as email, SMS/MMS, social media network posts or messages (e.g., via Facebook or Twitter), instant messaging services, voicemail, or a messaging service internal to the server. The transmission can be repeated for each recommendation to be sent to the first user, or a single transmission can be used to send multiple recommendations to the first user. FIG. 10 is a flow diagram illustrating the process for fulfilling a recommendation request in accordance with some implementations. Each of the operations shown in FIG. 10 may correspond to instructions stored in a computer memory or computer readable storage medium. Optional operations are indicated by dashed lines (e.g., boxes with dashed-line borders). In some implementations, the method described in FIG. 10 is performed by the server system (FIG. 1, 120).

In accordance with some implementations, the server system (FIG. 1, 120), in accordance with a determination that the received recommendation satisfies the criteria, transmits the recommendation to the requesting user (1002). The recommendation is sent to the user via any messaging system including, but not limited to e-mail, text messaging, voice messaging, social network messaging, or a messaging service internal to the server system. The server system (FIG. 1, 120) receives a purchase decision from the first user in response to a product recommendation (1004). In some implementations, the user responds directly to the recommendation server sent from the server system. The server system (FIG. 1, 120), in response to receiving a purchase decision, purchases the product on behalf of the first user (1006). The server system (FIG. 1, 120) updates the trust graph associated with the first user and/or the recommending user based on the purchase decision (1008).

Figure 11:
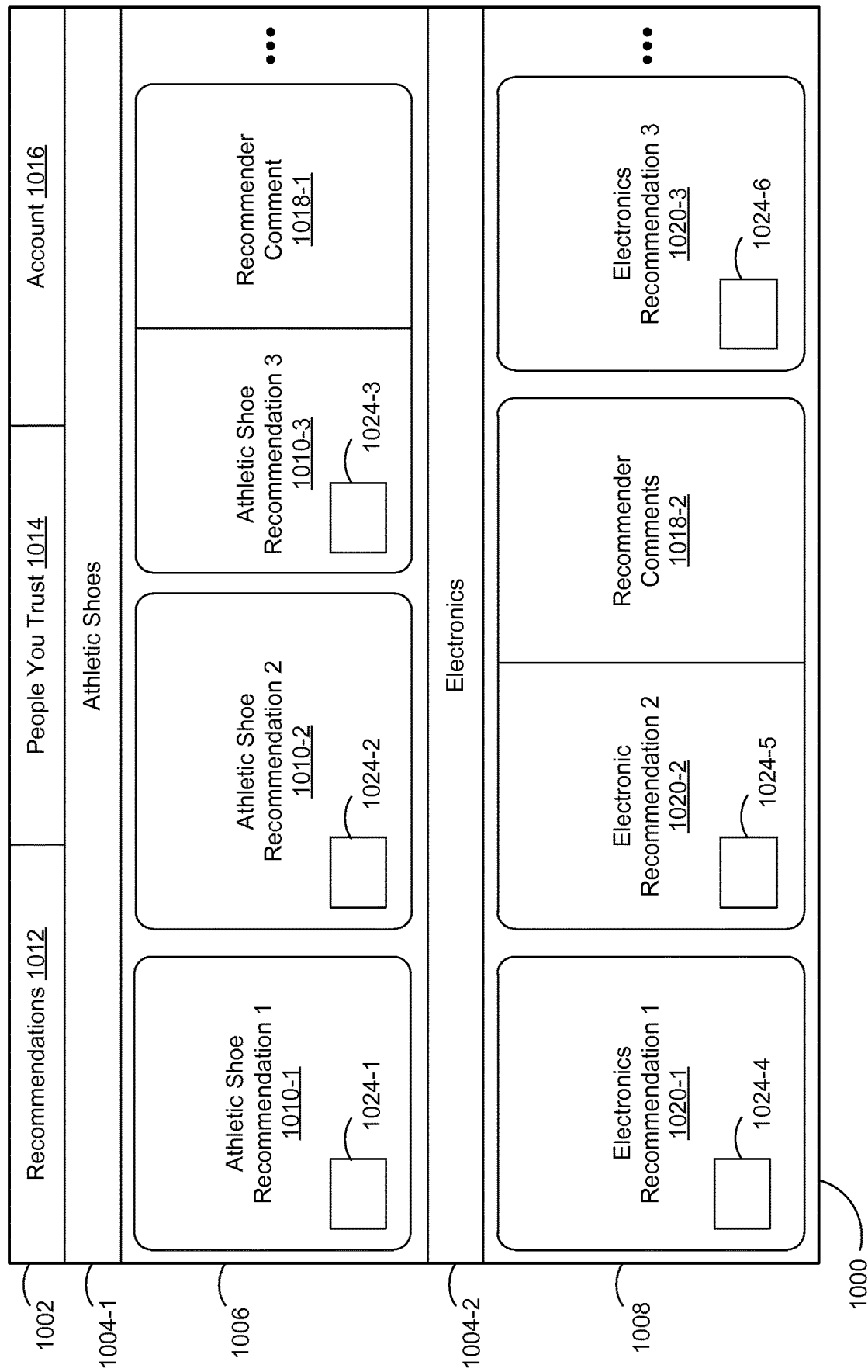
FIG. 11 illustrates an exemplary user interface in accordance with some embodiments.
Figure 12:
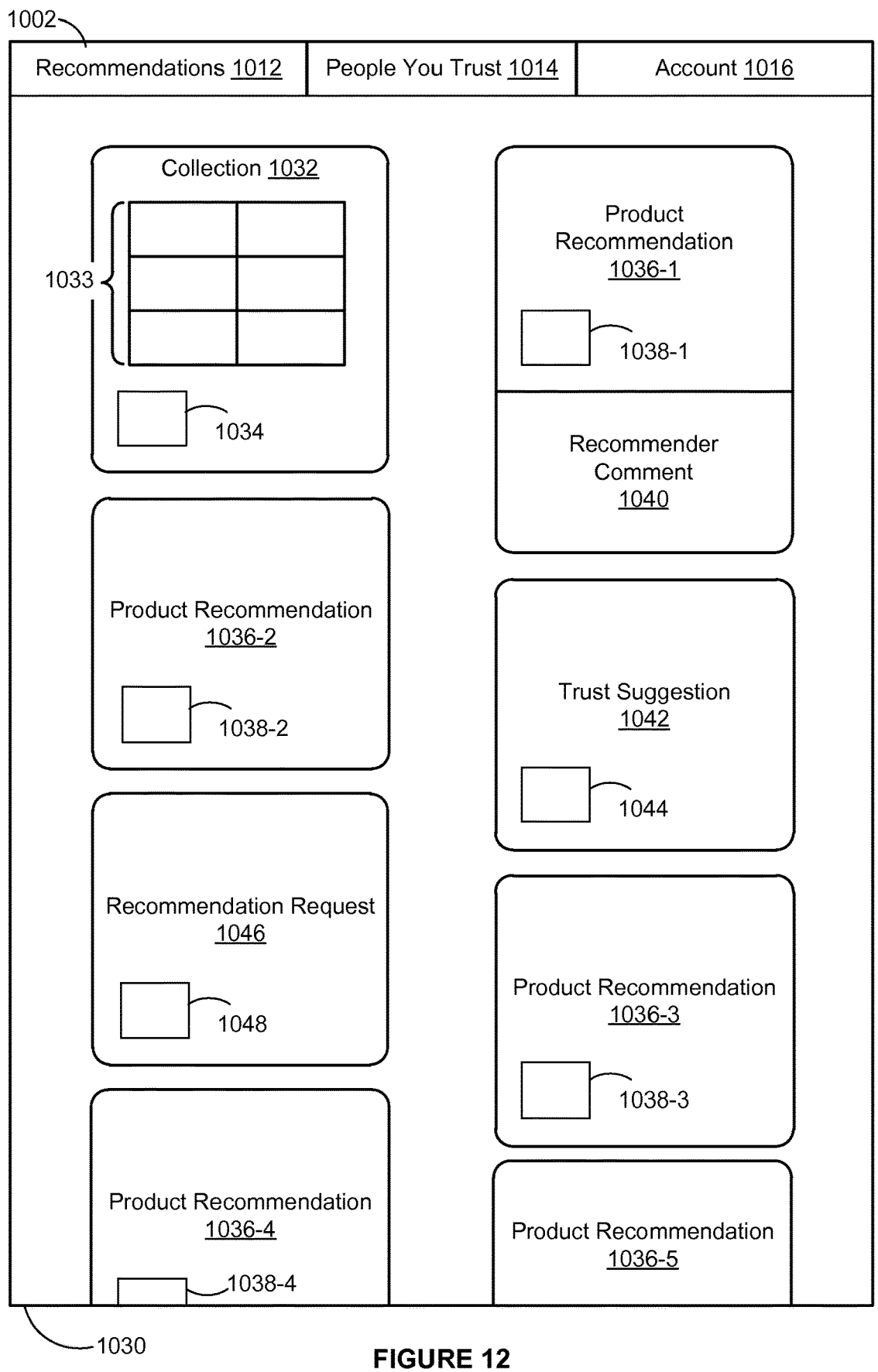
FIG. 12 illustrates an exemplary user interface in accordance with some embodiments.
Figure 13:
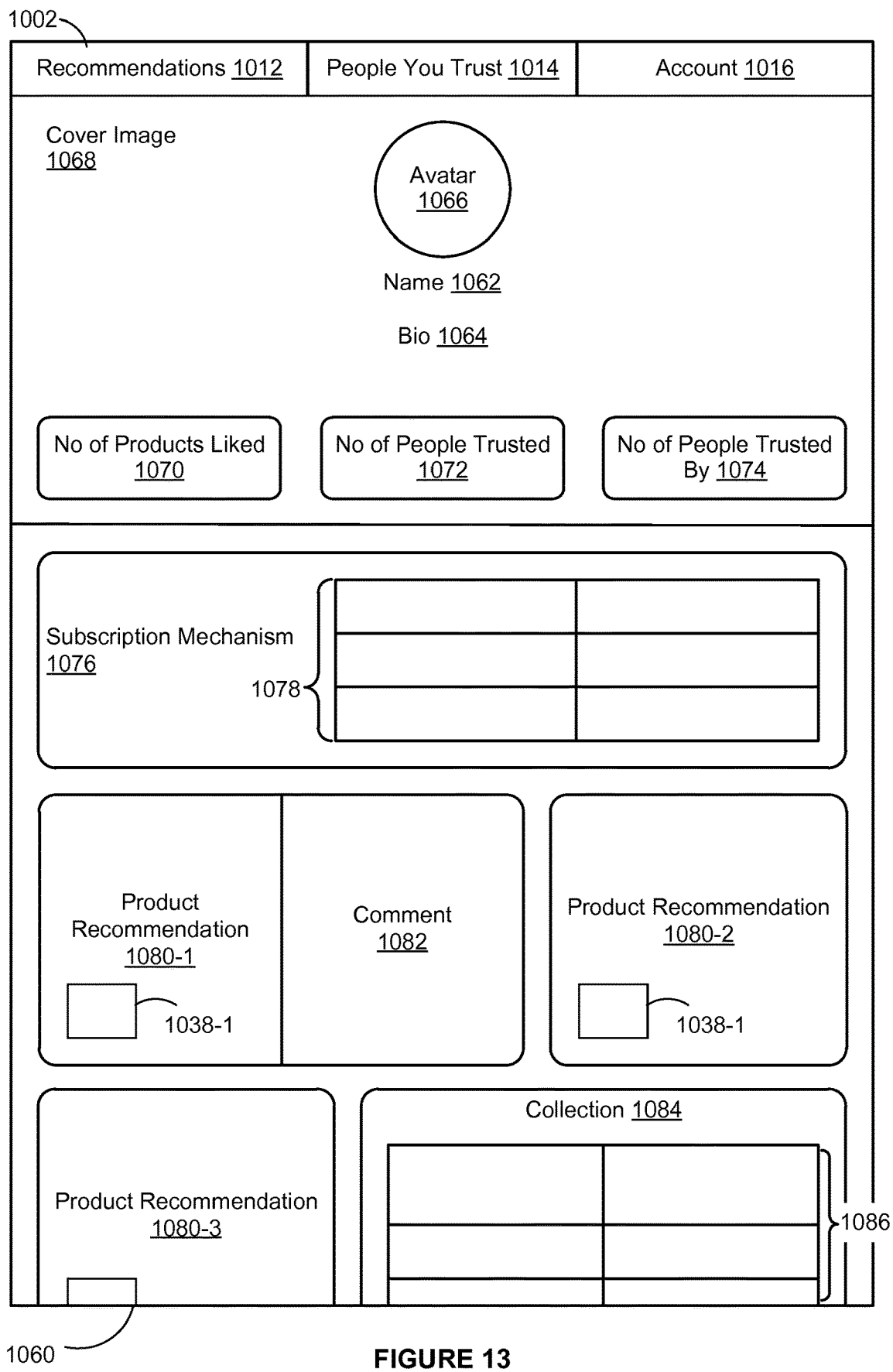
FIG. 13 illustrates an exemplary user interface in accordance with some embodiments.

Attention is now directed towards embodiments of user interfaces and associated processes that may be implemented by a respective client system 102 (FIG. 1). FIGS. 11-13 show user interfaces displayed on display 106 (FIG. 1) of the respective client system 102 (FIG. 1) (e.g., a mobile phone, tablet computing device, laptop computer, desktop computer, wearable computing device, or other computing device) according to some embodiments. In some embodiments, user interfaces are displayed on a touch screen display that is configured to receive one or more contacts and display information (e.g., media content, web pages, and/or user interfaces for an application). The user interfaces in FIGS. 11-13 are used to illustrate some of the processes described herein.

For example, in response to detecting user selection of the "Recommendations" affordance 1012, client system 102 (FIG. 1) sends an indication of selection of "Recommendations" affordance 1012 to server system 120 (FIG. 1). In response to receiving the indication, server system 120 (FIG. 1) transmits to client system 102 (FIG. 1) a recommendations interface corresponding to "Recommendations" affordance 1012 for display.

FIG. 11 illustrates an exemplary user interface 1100 displaying recommendations of products to a user of a server system (FIG. 1, 120). In this example, a web browser displays a web page associated with the server system (FIG. 1, 120). The web page includes a navigation bar 1102. The navigation bar 1102 includes a plurality of navigation buttons, for example a "Recommendations" button 1112, a "People You Trust" button 1114, and an "Account" button 1116. A user clicks on the various navigation buttons to see different web pages associated with the server system (FIG. 1, 120). In some implementations, the user interacts with a local application on her device rather than a web browser (e.g., a mobile application dedicated to the server system).

In some implementations, the user selects the "Recommendations" button 1112. In response, the server system (FIG. 1, 120) transmits recommendation data to the user for display (e.g., the server system transmits a web page for display in a browser, or instructions to display a user interface in a mobile application). In this example, the displayed data includes regions corresponding to a plurality of product category areas (e.g., product category regions 1104-1 and 1104-2). The server system (FIG. 1, 120) determines the displayed categories based on the user's interests. Each product category region 1104 includes a plurality of product recommendations (e.g., recommendations 1110-1, 1110-2, 1110-3, 1120-1, 1120-2, and 1120-3) and associated images. In this example, the athletic shoes region (1104-1) includes three athletic shoe recommendations (1110-1, 1110-2, and 1110-3).

In some implementations, each recommendation 1110/1120 includes an indication of the recommending user (1124-1 through 1124-6). In some implementations, the indication is an image associated with the recommending user (e.g., a profile picture or avatar). In some implementations, the indication includes the name of the recommending user listed in text. In some implementations, the indication includes a link to the profile of the recommending user. Some implementations include all or some of the above listed indications. In some implementations, the recommendations also include a user interface element, such as a link, button, or another user interface element, that allows the user to request the recommendation source information for that recommendation.

In some implementations, a recommendation 1110/1120 includes recommender comments (e.g., recommender comments 1118-1 or 1118-2) that describe some or all of the recommending user's thoughts on the recommended product in more detail. In some implementations, every recommendation has an associated recommender comment, but they are only shown upon user request. In some implementations, only relevant portions of the comment are shown.

FIG. 12 illustrates exemplary user interface 1030 corresponding to the recommendations interface received from server system 120 (FIG. 1). In FIG. 12, user interface 1030 includes a plurality of information regions corresponding to product recommendations and other information associated with the commerce service provided by server system 120 (FIG. 1). In FIG. 12, user interface 1030 includes a plurality of product recommendation 1036 (e.g., 1036-1, 1036-2, 1036-3, 1036-4, 1036-5), each including an indication 1038 (e.g., 1038-1, 1038-2, 1038-3, 1038-4, 1038-5) of the recommender. In FIG. 12, some product recommendations 1036 also include recommender comments. For example, product recommendation 1036-1 includes recommender comment 1040 provided by the recommender corresponding to indication 1038-1.

In FIG. 12, user interface 1030 also includes collection 1032 with a plurality of recommended products 1033 and an indication 1034 of the recommender/creator of collection 1032. In FIG. 12, collection 1032 includes a plurality of recommended products 1033. In some embodiments, collection 1032 is created by a merchant corresponding to indication 1034. For example, collection 1032 displayed at the top or near the top of the recommendations interface is created by a promoted merchant. Continuing with this example, recommended products 1033 include products associated with or produced by the promoted merchant.

In some embodiments, collection 1032 is a gift guide created by the user corresponding to indication 1034. In some embodiments, recommended products 1033 in collection 1032 are selected by the user corresponding to indication 1034 with an overarching theme or degree of relatedness such as products for an upcoming holiday (e.g., Halloween or Thanksgiving decorations), products for the same activity (e.g., camping gear, hunting gear, etc.), or products from the same category of products (e.g., mobile phone accessories, wooden flatware, grilling utensils, etc.).

In some embodiments, server system 120 (FIG. 1) creates collection 1032 (e.g., as a gift guide) based on the trust graph associated with the user of client system 102 (FIG. 1) or based on a trust graph associated with a second user included in the trust graph of the user of client system 102 (FIG. 1). For example, the user's trust graph includes the user's wife, and the user's wife's birthday is coming up soon. Continuing with this example, server system 120 (FIG. 1) generates a gift guide for display to the user of client system 102 (FIG. 1) that includes products 1033 determined based on the user's wife's trust graph (e.g., products liked or favorited by the user's wife) and/or by people within the user's wife's trust graph for purchase for the user's wife's upcoming birthday. In some embodiments, sever system 120 (FIG. 1)

can generate the gift guide from data that is imported or scraped from one or more external sources, such as another social network account associated with a gift recipient or the first user. In some embodiments, server system 120 (FIG. 1) accesses the first user's social media networks (e.g., the first user's Facebook account) to identify products or items that the first user has indicated that the first user likes and/or wants and/or items liked by other users that the first user trusts, as indicated by the trust graph of the first users. From this information, server system 120 (FIG. 1) can generate collection 1032, similar to a virtual registry, for the gift recipient or the first user.

In FIG. 11, user interface 1030 further includes trust suggestion 1042. In some embodiments, server system 120 (FIG. 1) provides trust suggestions to the user of client system 102 (FIG. 1) and causes the trust suggestion to be presented to the user without requiring the user to request the trust suggestion. In some embodiments, trust suggestion 1042 prompts the user of client system 102 (FIG. 1) to add another user in the community of users to the user's trust graph. For example, the suggested other user is trusted by one or more of the connections already included in the user's trust graph. In another example, the suggested other user is trusted by a predefined amount of other users in the community of users (e.g., the suggested other user is a "highly influential" or "power user"). In yet another example, the suggested other user previously made recommendations for products that the user has purchased and/or otherwise provided an indication that the user would like or trust the suggested other user.

In FIG. 11, user interface 1030 further includes recommendation request 1046. In some embodiments, recommendation request 1046 is a request for a product recommendation from a requesting user that prompts the user of client system 102 (FIG. 1) to provide a recommendation to the requesting user. In some embodiments, recommendation request 1046 can be a request from a self-purchasing user as a gift request to prompt the users within the trust graph of the self-purchasing user to recommend one or more products for the self-purchasing user. In some embodiments, recommendation request 1046 includes one or more parameters or specifications for the recommendation such as a product category for the recommendation (e.g., a request for recommendations related to selvedge denim or sushi knives). For example, the user of client system 102 (FIG. 1) responds to recommendation request 1046 by selecting goods or services to recommend to the requesting user. After the user of client system 102 (FIG. 1) selects one or more products in response to recommendation request 1046, client system 102 (FIG. 1) transmits a recommendation to server system 120 (FIG. 1). In turn, server system 120 (FIG. 1) receives one or more recommendations (at least including the recommendation from the user of client system 102 (FIG. 1)) and determines one or more recommendations to send to the requesting user.

In some embodiments, user interface 1030 further includes a same-day gifting affordance (not shown in FIG. 12). In response to selection of the same-day gifting affordance by the user, server system 120 (FIG. 1) receives a notification from client system 102 (FIG. 1) of the user's intent to send a gift to a specified recipient within the same calendar day. Server system 120 (FIG. 1) determines one or more potential products for same day delivery based on a budget specified by the user, geographic constraints imposed by the giftee's address, and same-day couriers' shipment timetables. Server system 120 then presents the one or more potential products for same day delivery to the user. Thereafter, the user is able to select one or more of the one or more potential products for same day delivery to the giftee.

For example, with respect to FIG. 12, the user of client system 102 (FIG. 1) selects indication 1038-1 associated with product recommendation 1036-1. In this example, client system 102 (FIG. 1) sends, to server system 120 (FIG. 1), a notification indicating the user's selection of indication 1038-1. Continuing with this example, in response to receiving the indication, server system 120 (FIG. 1) transmits to client system 102 (FIG. 1) a user profile interface of a second user. The user profile interface corresponds to the second user in the community of users who provided product recommendation 1036-1 and who is associated with selected indication 1038-1.

FIG. 13 illustrates exemplary user interface 1060 displaying, to the user of client system 102, the user profile interface of the second user who corresponds to indication 1038-1 in FIG. 12, where the user profile interface was provided to client system 102 (FIG. 1) by server system 120 (FIG. 1) in response to selection of indication 1038-1 in FIG. 12. In FIG. 13, user interface 1060 includes a name or handle 1062, biographical information 1064, an avatar 1066, and a cover image 1068 associated with the second user. In FIG. 13, user interface 1060 also includes a number of products 1070 liked by the second user, a number of people 1072 who the second user trusts, and a number of people 1074 who trust the second user.

In FIG. 13, user interface 1060 further includes a subscription mechanism 1076, including a plurality of products 1078 managed by the second user. In some embodiments, the second user updates subscription mechanism 1076 by adding products to or removing products from the plurality of products 1078. In some embodiments, in response to selection of subscription mechanism 1076 by the user of client system 102 (FIG. 1), the user of client system 102 (FIG. 1) is subscribed to the plurality of products 1078. In some embodiments, server system 120 (FIG. 1) purchases all of the plurality of products 1078 for subscribers of subscription mechanism 1076 without first seeking the approval of the user of client system 102 (FIG. 1) for each purchase. In some embodiments, server system 120 (FIG. 1) purchases products corresponding to updates of the plurality of products 1078 for subscribers of subscription mechanism 1076 without first seeking their approval for each purchase. In some embodiments, server system 120 (FIG. 1) purchases a subset of the plurality of products 1078 for a respective subscriber of subscription mechanism 1076 that match one or more parameters predefined by the respective subscriber of subscription mechanism 1076 without first seeking the approval of the respective subscriber for each purchase. In some embodiments, subscribers to subscription mechanism 1076 are notified (e.g., via email or SMS) of updates to the plurality of products 1078.

In FIG. 13, user interface 1060 further includes product recommendations 1080 (e.g. 1080-1-1080-3) recommended by the second user. For example, product recommendation 1080-1 also includes comment 1082 from the second user explaining why he/she recommended the product. In FIG. 13, user interface 1060 also includes collection 1084 created by the second user including a plurality of products 1086.

Figure 14:
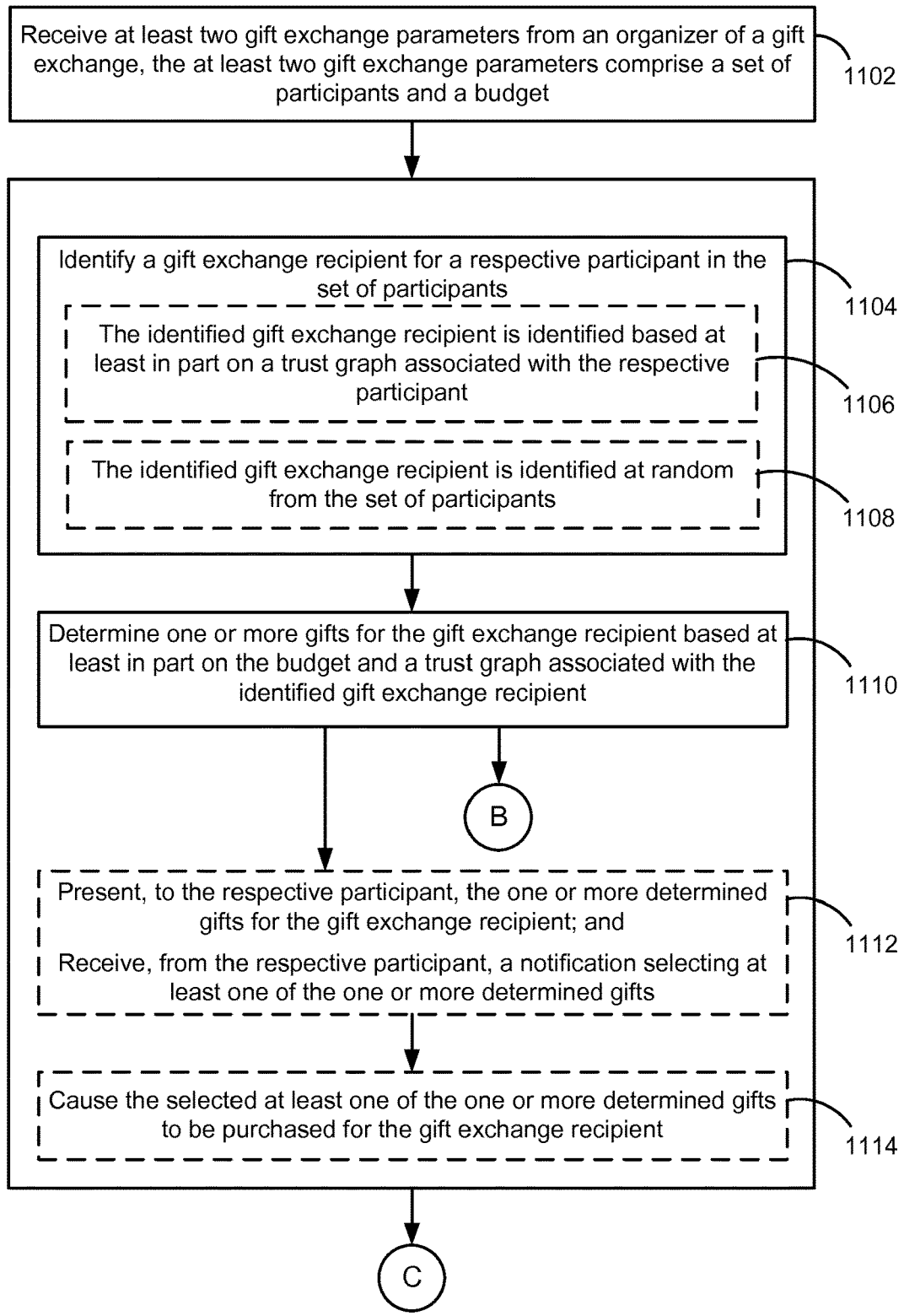
FIG. 14 illustrates a flowchart representation of a method of managing a gift exchange in accordance with some embodiments.
Figure 15:
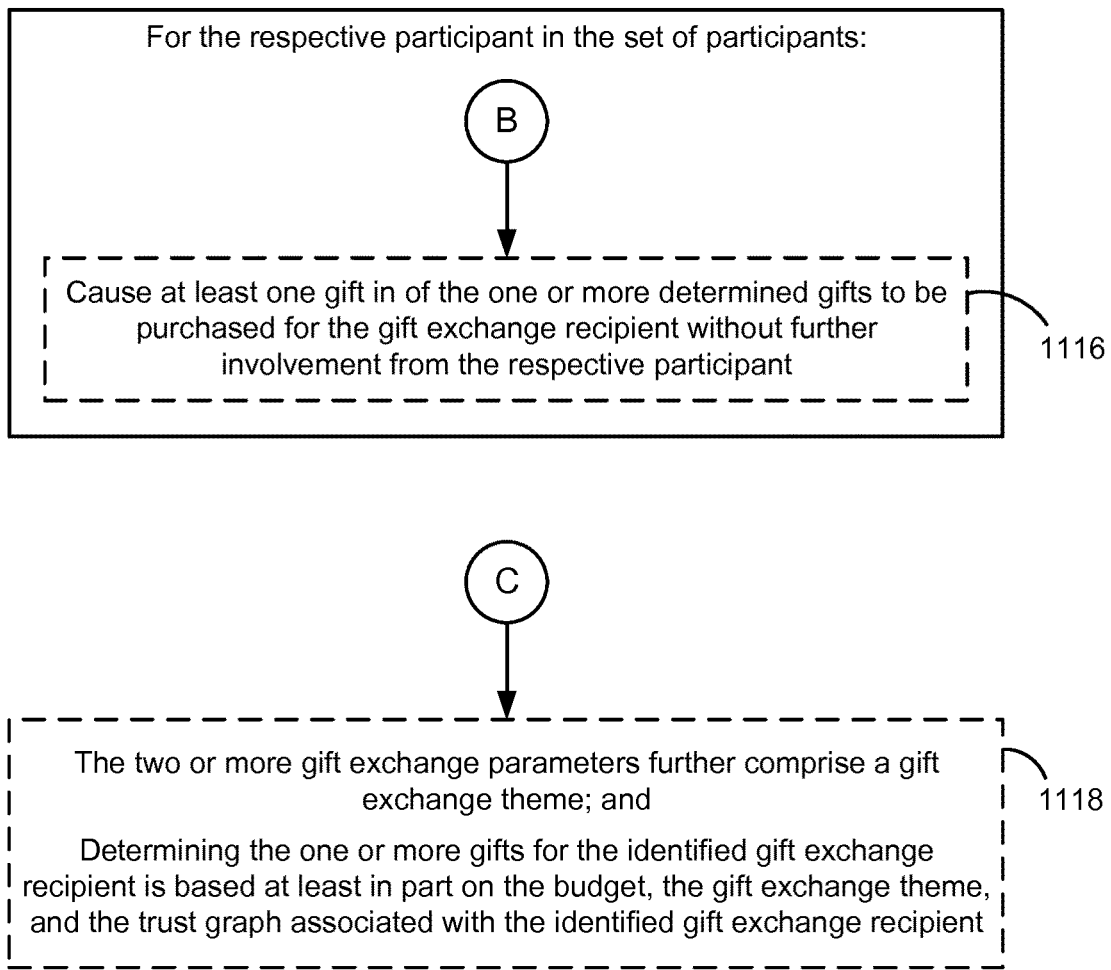
FIG. 15 further illustrates the flowchart representation of the method of managing a gift exchange according to FIG. 14.

FIGS. 14-15 illustrate a flowchart representation of a method 1100 of managing a gift exchange in accordance with some embodiments. The method is, optionally, governed by instructions that are stored in a computer memory or non-transitory computer readable storage medium (e.g., memory 306, FIG. 3) and that are executed by one or more processors or cores (e.g., CPU(s) 302, FIG. 3) of one or more systems, such as, but not limited to, server system 120 (FIGS. 1 and 3). The computer readable storage medium may include one or more non-volatile memory devices such as one or more magnetic or optical disk storage devices, one or more solid state storage devices (e.g., NAND or NOR flash memory), or one or more other non-volatile memory devices. The computer readable instructions stored on the computer readable storage medium may include one or more of: source code, assembly language code, object code, or other instruction format that is interpreted by one or more processors. In various embodiments, some operations in each method may be combined and/or the order of some operations may be changed from the order shown in the figures and/or described herein. Also, in some embodiments, operations shown in separate figures and/or discussed in association with separate methods (e.g., method 1200, FIGS. 16-17 and/or method 1300, FIGS. 18-19) may be combined to form other methods, and operations shown in the same figure and/or discussed in association with the same method may be separated into different methods. For ease of explanation, at least some aspects of method 1100 are described with reference to a server (e.g., server system 120, FIGS. 1 and 3). Optional operations in some embodiments are indicated by dashed lines (e.g., boxes with dashed-line borders).

The server receives (1102) at least two gift exchange parameters from an organizer of a gift exchange, the two or more gift exchange parameters comprising at least a set of participants and a budget. In some embodiments, server system 120 (FIG. 1) provides a gift exchange feature within the commerce service to the community of users. For example, an organizer accesses a setup/initialization interface of the gift exchange feature and inputs two or more parameters for the gift exchange. The two or more parameters include at least the names of a set of participants for the gift exchange and a budget for gifts purchased for the gift exchange.

In some embodiments, all of the participants in the set of participants for the gift exchange are registered with the commerce service provided by server system 120 (FIG. 1). However, if an identified participant in the set of participants is not registered with the commerce service, server system 120 (FIG. 1) will send a notification to the identified participant prompting the identified participant to create an account or profile associated with the commerce service in order to participate in the gift exchange.

Alternatively, if an identified participant in the set of participants is not registered with the commerce service, server system 120 (FIG. 1) creates an account or profile in the commerce service for the second user without any involvement from the second user (e.g., a preliminary or placeholder account or profile) and sends a notification to the second user to discover the commerce system (e.g., complete filing out the details of the preliminary or placeholder account or profile) and that the account or profile has been created for them.

In some embodiments, prior to performing operations associated with the gift exchange, server system 120 (FIG. 1) sends a notification to each of the participants in the set of participants to authorize participation in the gift exchange. This way, participants will not be subject to the gift exchange if they were included in error or against their will. As such, in some embodiments, server system 120 (FIG. 1) does not perform operations associated with the gift exchange until authorization for participation is received from all or at least a predetermined number of the set of participants.

For a respective user in the set of participants, the server identifies (1104) a gift exchange recipient. After the organizer inputs the parameters for the gift exchange and server system 120 (FIG. 1) receives the parameters from client system 102 (FIG. 1), server system 120 (FIG. 1) identifies a gift exchange recipient for each of the participants in the gift exchange.

In some embodiments, as part of the server identifying (1104) the gift exchange recipient, the identified gift exchange recipient is identified (1106) based at least in part on a trust graph associated with the respective participant. In some embodiments, server system 120 (FIG. 1) selects a most trusted user in the set of participants as the gift recipient for the respective participant. For example, server system 120 (FIG. 1) determines a user in the set of participants that is most trusted (i.e., has a highest trust rating) among the set of participants based on the trust graph of the respective user.

In some embodiments, also as part of the server identifying (1104) the gift exchange recipient, the identified gift exchange recipient is identified (1108) at random from the set of participants or from a group of trusted participants (e.g., with whom the respective user has same or similar trust levels). In some embodiments, server system 120 (FIG. 1) selects the gift recipient for the respective participant at random from the set of participants.

For the respective user in the set of participants, the server determines (1110) one or more gifts for the identified gift exchange recipient based at least in part on the budget and a trust graph associated with the identified gift exchange recipient. In some embodiments, server system 120 (FIG. 1) determines one or more products or gifts (e.g., goods or services) for the identified gift exchange recipient based on the budget specified by the organizer and the trust graph associated with the identified gift exchange recipient. As such, for example, server system 120 (FIG. 1) determines one or more potential products that suit the tastes of the identified gift exchange recipient and that are within the budget.

In some embodiments, server system 120 (FIG. 1) also uses information included in a user profile associated with the identified gift exchange recipient to determine the one or more potential products. In this way, the one or more potential products will be products that conform to the identified gift exchange recipient's taste (e.g., products previously purchased, liked, favorited, or otherwise identified by the identified gift exchange recipient while pursuing the commerce service).

In some embodiments, for the respective user in the set of participants, the server presents (1112), to the respective participant, the one or more determined gifts for the gift exchange recipient and receives, from the respective participant, a notification selecting at least one of the one or more determined gifts. In some embodiments, after determining the one or more potential products for the identified gift exchange recipient, server system 120 (FIG. 1) presents to the respective user the one or more potential products that were determined to be appropriate for the identified gift exchange recipient. In some embodiments, presenting the one or more potential products to the respective user includes sending a web page or interface including the one or more potential products to client system 102 (FIG. 1) for presentation/display to the respective user via the web browser or local application associated with the commerce service. Thereafter, the respective user selects one of the one or more potential products to purchase for the identified gift exchange recipient. In response to detecting the user input selecting one of the one or more potential products, client system 102 (FIG. 1) sends a notification to server system 120 (FIG. 1) indicating the selected one of the one or more potential products. For example, the notification is a purchase decision 116 (FIG. 1) of the respective user's gift for their identified gift exchange recipient in the gift exchange.

In some embodiments, for the respective user in the set of participants, the server causes (1114) the selected at least one of the one or more determined gifts to be purchased for the gift exchange recipient. In some embodiments, server system 120 (FIG. 1) causes the selected one of the one or more potential products to be purchased by the respective user for the identified gift exchange recipient by purchasing the selected product and billing the respective user or, alternatively, by prompting an external mechanism to purchase the selected product.

In some embodiments, for the respective user in the set of participants, after point B, the server causes (1116) at least one gift from the one or more determined gifts to be purchased for the gift exchange recipient without further involvement (e.g., notification or input) from the respective participant. In this embodiment, the respective participant does not select the at least one gift. In some embodiments, server system 120 (FIG. 1) causes the selected at least one of the one or more potential products to be purchased by the respective user for the identified gift exchange recipient without receiving a notification of the product selected by the respective user. For example, in some embodiments, after determining the one or more potential products, without further user input, server system 120 (FIG. 1) selects product(s) from the one or more potential products and causes the selected product(s) to be purchased by the respective user for the identified gift exchange recipient by purchasing the selected product(s) and billing the respective user or, alternatively, by prompting an external mechanism to purchase the selected product(s). As such, server system 120 (FIG. 1) purchases a gift for the identified gift exchange recipient without involvement from the respective user.

In some embodiments, after point C, the two or more gift exchange parameters further include (1118) a gift exchange theme (e.g., white elephant, holiday, and the like) and determining the one or more gifts for the identified gift exchange recipient is based at least in part on the budget, the gift exchange theme, and the trust graph associated with the identified gift exchange recipient or the respective user (e.g., the giftor). In some embodiments, the organizer of the gift exchange also specifies a theme for the gift exchange such as a seasonal-theme, holiday-theme, or a white elephant-theme with gag gifts. In turn, server system 120 (FIG. 1) determines one or more potential products for the identified gift exchange recipient based on the trust graph associated with the identified gift exchange recipient, the budget, and the theme selected by the organizer.

Figure 16:
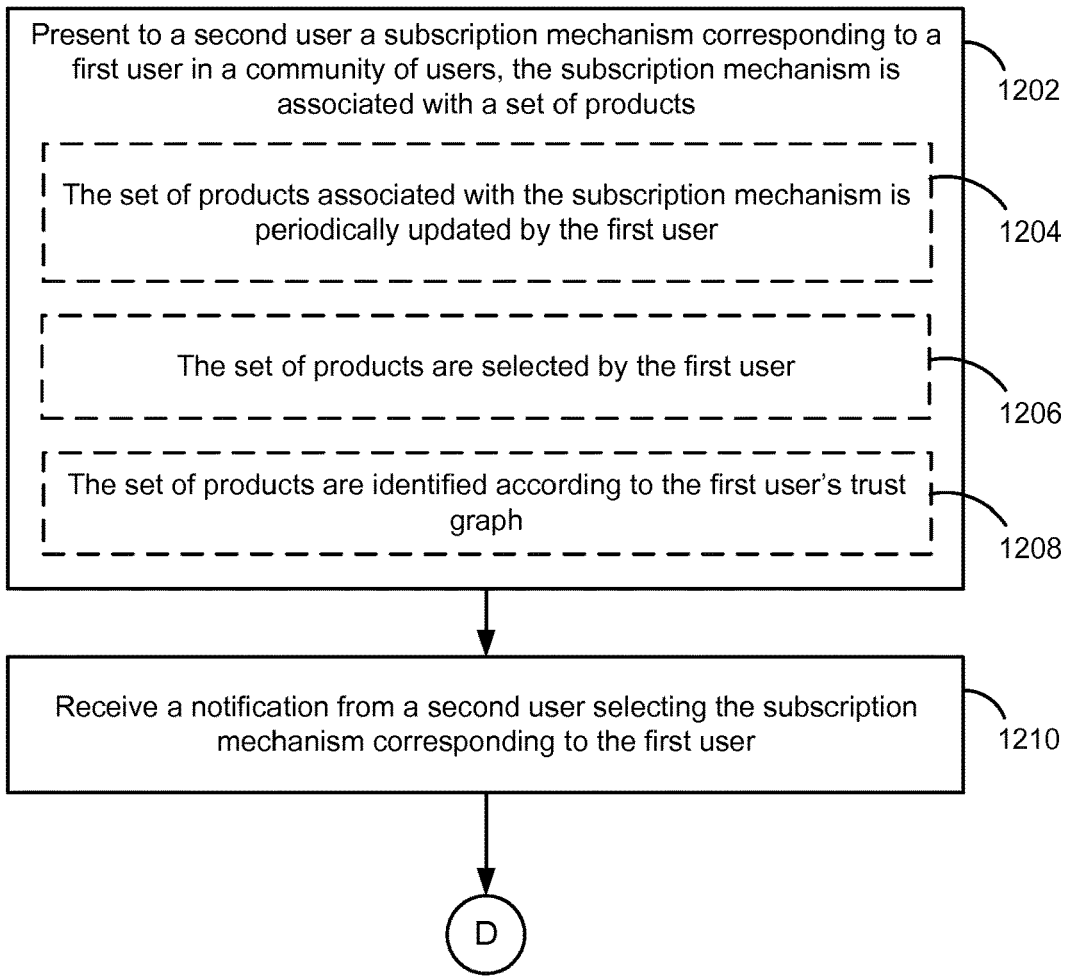
FIG. 16 illustrates a flowchart representation of a method of purchasing products via a subscription mechanism in accordance with some embodiments.
Figure 17:
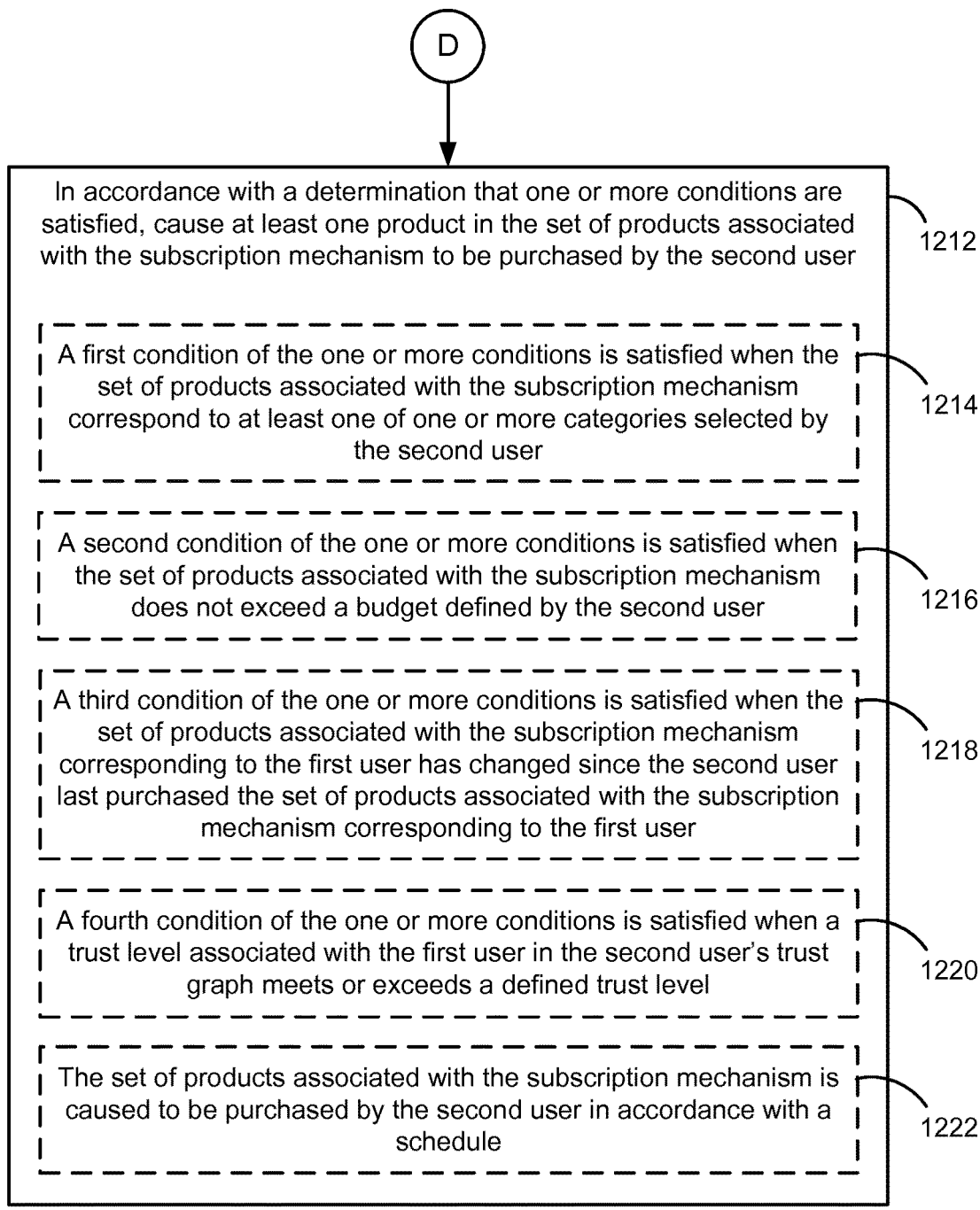
FIG. 17 further illustrates the flowchart representation of the method of purchasing products via a subscription mechanism according to FIG. 16.

FIGS. 16-17 illustrate a flowchart representation of a method 1200 of purchasing products via a subscription mechanism in accordance with some embodiments. The method is, optionally, governed by instructions that are stored in a computer memory or non-transitory computer readable storage medium (e.g., memory 306, FIG. 3) and that are executed by one or more processors or cores (e.g., CPU(s) 302, FIG. 3) of one or more systems, such as, but not limited to, server system 120 (FIGS. 1 and 3). The computer readable storage medium may include one or more non-volatile memory devices such as one or more magnetic or optical disk storage devices, one or more solid state storage devices (e.g., NAND or NOR flash memory), or one or more other non-volatile memory devices. The computer readable instructions stored on the computer readable storage medium may include one or more of: source code, assembly language code, object code, or other instruction format that is interpreted by one or more processors. In various embodiments, some operations in each method may be combined and/or the order of some operations may be changed from the order shown in the figures and/or described herein. Also, in some embodiments, operations shown in separate figures and/or discussed in association with separate methods (e.g., method 1100, FIGS. 14-15 and/or method 1300, FIGS. 18-19) may be combined to form other methods, and operations shown in the same figure and/or discussed in association with the same method may be separated into different methods. For ease of explanation, at least some aspects of method 1200 are described with reference to a server (e.g., server system 120, FIGS. 1 and 3). Optional operations in some embodiments are indicated by dashed lines (e.g., boxes with dashed-line borders).

The server presents (1202) a subscription mechanism corresponding to a first user in a community of users, the subscription mechanism is associated with a set of products. In FIG. 13, for example, client system 102 is displaying a user profile interface to a second user that corresponds to a first user in the community of users associated with the commerce service. In FIG. 13, for example, the first user's user profile interface includes subscription mechanism 1076. Subscription mechanism 1076 includes a plurality of products 1078 managed by the first user. In some embodiments, presenting the subscription mechanism to the second user includes sending a web page, URL link, or interface (e.g., user profile interface 1060 in FIG. 13) including the subscription mechanism to client system 102 (FIG. 1) for presentation/display to the second user via the web browser or local application associated with the commerce service. In some embodiments, a display outputs the subscription mechanism to the second user.

Returning to FIGS. 16-17, in some embodiments, as part of the server presenting (1202) the subscription mechanism, the set of products associated with the subscription mechanism is periodically updated (1204) by the first user. For example, with reference to FIG. 13, subscription mechanism 1076 includes a group of products 1078 that are periodically updated every day, week, month, or other time period by the first user.

Referring back to FIGS. 16-17, in some embodiments, also as part of the server presenting (1202) the subscription mechanism, the set of products is selected (1206) by the first user. For example, with reference to FIG. 13, subscription mechanism 1076 includes a group of products 1078 that are selected by the first user, such as the first user's weekly picks or endorsed/spotlighted products.

Again, returning to FIGS. 16-17, in some embodiments, further as part of the server presenting (1202) the subscription mechanism, the set of products is identified (1208) according to the first user's trust graph. In some embodiments, server system 120 (FIG. 1) identifies products to be included in the subscription mechanism corresponding to the first user based on the first user's trust graph. In some embodiments, server system 120 (FIG. 1) also uses information included in a user profile of the first user to determine products to be included in the subscription mechanism corresponding to the first user. In this way, the products included in the subscription mechanism corresponding to the first user conform to the first user's taste (e.g., products previously purchased, liked, favorited, or otherwise identified by the first user while pursuing the commerce service).

Next, the server receives (1210) a notification from a second user selecting the subscription mechanism corresponding to the first user. For example, with reference to FIG. 13, client system 102 (FIG. 1) detects the second user selecting subscription mechanism 1076 in user profile interface 1060 corresponding to the first user. In response to detecting selection of subscription mechanism 1076, client system 102 (FIG. 1) sends a notification to server system 120 (FIG. 1) indicating selection of subscription mechanism 1076 by the second user. In some embodiments, the system receives the notification via an input. In some embodiments, in response to receiving the notification, server system 120 (FIG. 1) subscribes the second user to subscription mechanism 1076 corresponding to the first user.

Returning to FIGS. 16-17, in accordance with a determination that one or more conditions are satisfied, after point D, the server causes (1212) at least one product in the set of products associated with the subscription mechanism to be purchased by the second user. In some embodiments, server system 120 (FIG. 1) is configured to cause product(s) from products 1078 associated with subscription mechanism 1076 to be purchased by the second user. In some embodiments, the second user specifies one or more parameters or conditions that must be satisfied prior to allowing server system 120 (FIG. 1) to cause product(s) associated with the subscription mechanism to be purchased. In some embodiments, the product(s) are purchased without further user interaction. In some embodiments, one or more conditions satisfied can include a period of time has passed or cycled. For example, one condition can comprise purchasing the set of products associated with the subscription mechanism annually, monthly, weekly or daily.

In some embodiments, as part of causing (1212) the at least one product to be purchased, a first condition of the one or more conditions is satisfied (1214) when the set of products associated with the subscription mechanism correspond to at least one of one or more categories selected by the second user. In some embodiments, the second user specifies a first condition precedent to purchasing products associated with the subscription mechanism specifying that products associated with the subscription mechanism must be associated with or related to one of one or more predetermined categories. For example, the second user specifies that only when the subscription mechanism includes home goods, home stereo electronics, or camping gear will the products associated with the subscription mechanism be purchased.

In some embodiments, also as part of causing (1212) the at least one product to be purchased, a second condition of the one or more conditions is satisfied (1216) when the set of products associated with the subscription mechanism does not exceed a budget predefined by the second user. In some embodiments, the second user specifies a second condition precedent to purchasing products associated with the subscription mechanism specifying that products associated with the subscription mechanism must fit within a predefined budget. For example, the second user specifies that only when the subscription mechanism includes products totaling less than $100 will the products associated with the subscription mechanism be purchased. In some embodiments, the budget comprises a budget range (e.g. $90.00-110.00).

In some embodiments, further as part of causing (1212) the at least one product to be purchased, a third condition of the one or more conditions is satisfied (1218) when the set of products associated with the subscription mechanism corresponding to the first user has changed since the second user last purchased the set of products associated with the subscription mechanism corresponding to the first user. In some embodiments, the second user specifies a third condition precedent to purchasing products associated with the subscription mechanism specifying that products associated with the subscription mechanism must be updated from when the second user last purchased products associated with the subscription mechanism. For example, the second user specifies that only when the subscription mechanism includes new or "fresh" products will the products associated with the subscription mechanism be purchased. Alternatively or additionally, in some embodiments, the second user does not buy the set of products associated with the first user's subscription affordance when the set of products are the same or have not been updated for a predetermined number of hours or days.

In some embodiments, additionally as part of causing (1212) the at least one product to be purchased, a fourth condition of the one or more conditions is satisfied (1220) when a trust level associated with the first user in the second user's trust graph meets or exceeds a predefined trust level. In one example, the set of products are only purchased when the second user trusts the first user in the categories corresponding to the set of products. In another example, the set of products are only purchased when the second user continues to trust the first user. In some embodiments, the second user specifies a fourth condition precedent to purchasing products associated with the subscription mechanism specifying that the second user's trust graph must have a trust level for the first user corresponding to the subscription mechanism that meets or exceeds a predefined minimum trust level. For example, the second user specifies that only when the second user's trust graph indicates a trust level for the first user corresponding to the subscription mechanism that is above 0.5 will the products associated with the subscription mechanism be purchased. As such, if the second user's trust level for the first user diminishes over time, products associated with the first user's subscription mechanism will not be purchased by the second user even though the second user is still subscribed to the first user's subscription mechanism.

In some embodiments, as part of causing (1212) the at least one product to be purchased, the set of products associated with the subscription mechanism is caused to be purchased (1222) by the second user in accordance with a schedule. In some embodiments, the second user can predetermine the schedule. For example, bi-weekly, weekly, monthly, etc. purchasing of products associated with a subscription mechanism. In some embodiments, the second user specifies the purchasing frequency of the products associated with the first user's subscription mechanism. In some embodiments, the schedule can be based on events related to the second user, for example, a birthday and/or anniversary of the second user. In another embodiment, the schedule can be based on events associated with at least one user. For example, the second user can set up a schedule to purchase a subscription associated with a recipient user's trust graph based on events associated with the recipient user, such as a birthday of the recipient user.

Figure 18:
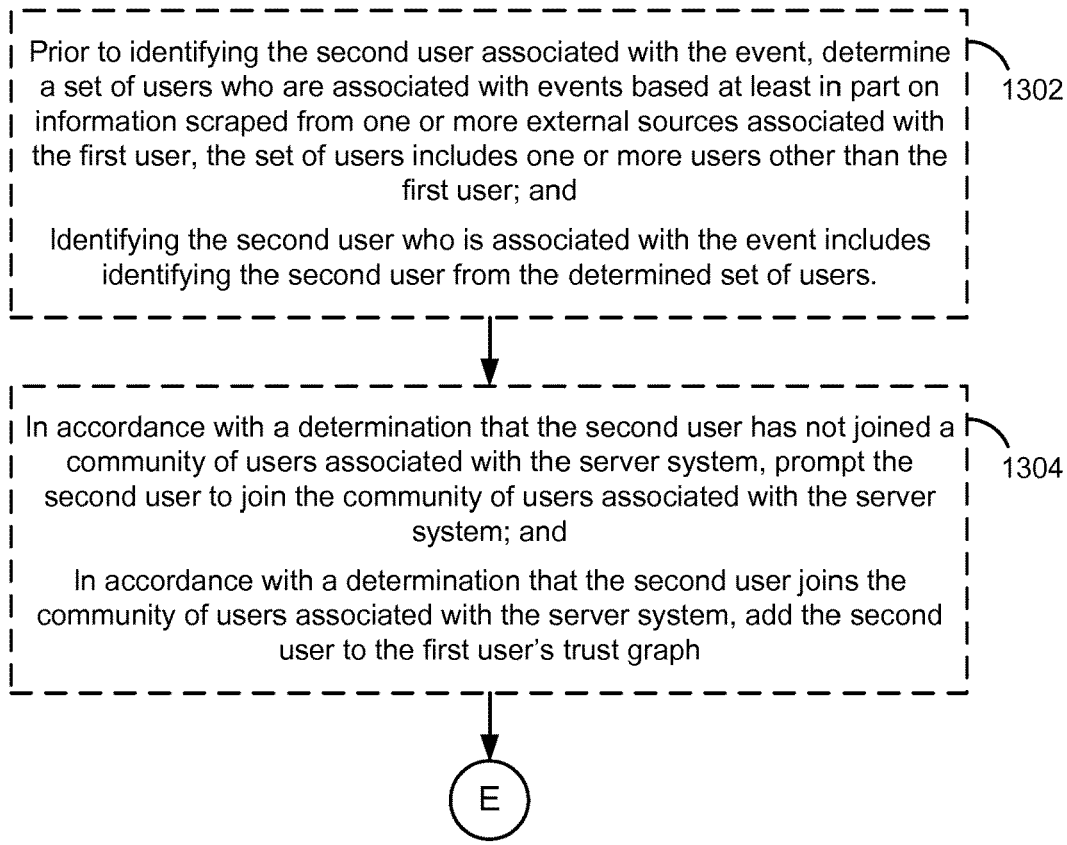
FIG. 18 illustrates a flowchart representation of a method of trusted gifting in accordance with some embodiments.
Figure 18:
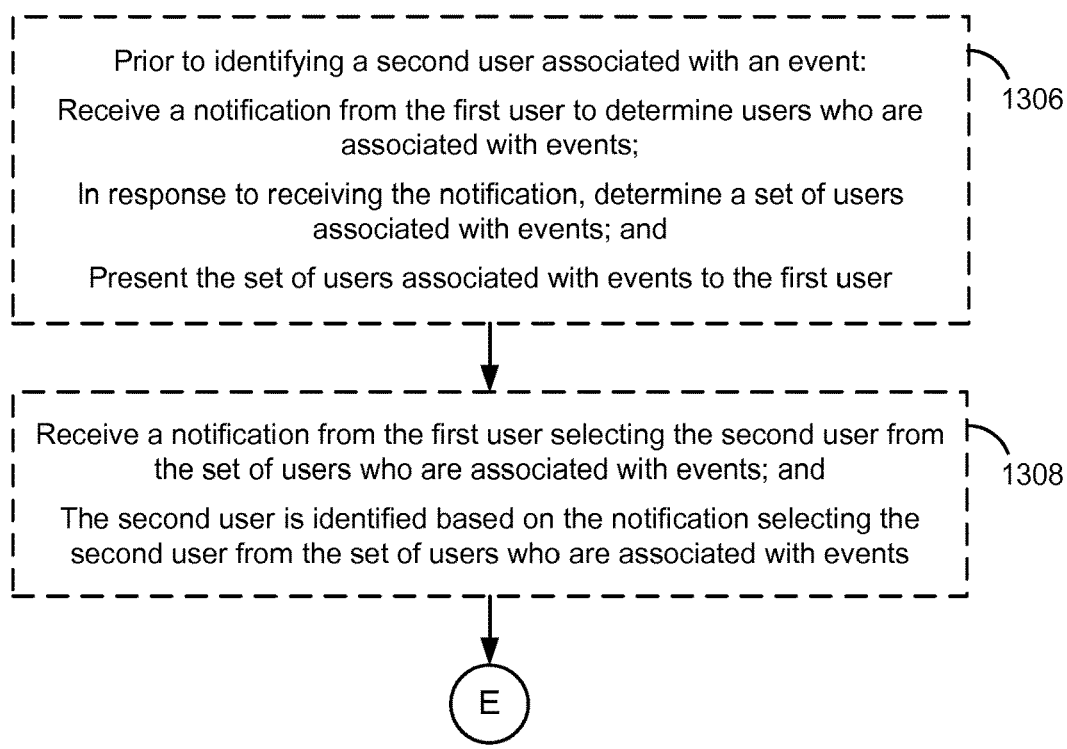
Figure 19:
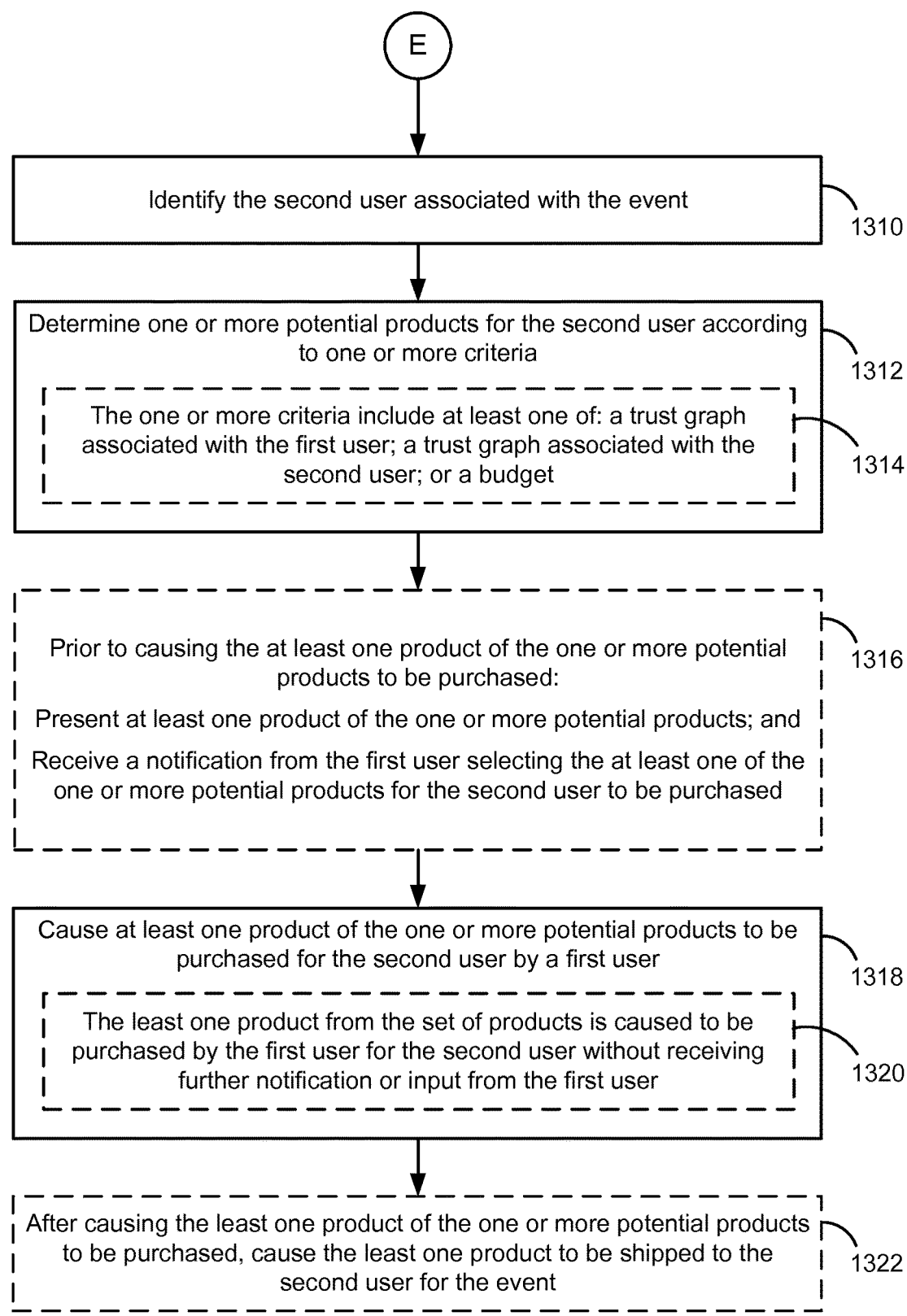
FIG. 19 further illustrates the flowchart representation of the method of trusted gifting according to FIG. 18.

FIGS. 18-19 illustrate a flowchart representation of a method 1300 of trusted gifting in accordance with some embodiments. The method is, optionally, governed by instructions that are stored in a computer memory or non-transitory computer readable storage medium (e.g., memory 306, FIG. 3) and that are executed by one or more processors or cores (e.g., CPU(s) 302, FIG. 3) of one or more systems, such as, but not limited to, server system 120 (FIGS. 1 and 3). The computer readable storage medium may include one or more non-volatile memory devices such as one or more magnetic or optical disk storage devices, one or more solid state storage devices (e.g., NAND or NOR flash memory), or one or more other non-volatile memory devices. The computer readable instructions stored on the computer readable storage medium may include one or more of: source code, assembly language code, object code, or other instruction format that is interpreted by one or more processors. In various embodiments, some operations in each method may be combined and/or the order of some operations may be changed from the order shown in the figures and/or described herein. Also, in some embodiments, operations shown in separate figures and/or discussed in association with separate methods (e.g., method 1100, FIGS. 14-15 and/or method 1200, FIGS. 16-17) may be combined to form other methods, and operations shown in the same figure and/or discussed in association with the same method may be separated into different methods. For ease of explanation, at least some aspects of method 1300 are described with reference to a server (e.g., server system 120, FIGS. 1 and 3). Optional operations in some embodiments are indicated by dashed lines (e.g., boxes with dashed-line borders).

In some embodiments, prior to identifying a second user associated with an event, the server determines (1302) a set of users who are associated with events based at least in part on information scraped from one or more external sources (e.g., address book, calendar, social media networks, etc.) associated with the first user, where the set of users includes one or more users other than the first user; and the server identifies the second user who is associated with the event includes identifying the second user from the determined set of users. In some embodiments, server system 120 (FIG. 1) accesses the first user's social media networks (e.g., the first user's Facebook account) to identify a set of the first user's friends with upcoming or recently past events (e.g., upcoming or belated birthdays, anniversaries, holidays, and so on). Additionally or alternatively, in some embodiments, server system 120 (FIG. 1) accesses calendar(s) and address book(s) associated with the first user (e.g., stored local to, or remote from, client system 102, FIG. 1) to identify a set of the first user's friends with upcoming or recently past events (e.g., upcoming or belated birthdays, anniversaries, holidays, and so on).

In some embodiments, in accordance with a determination that the second user has not joined a community of users associated with the server system, the server prompts (1304) the second user to join the community of users associated with the server system, and, in accordance with a determination that the second user joins the community of users associated with the server system, the server adds the second user to the first user's trust graph. In some embodiments, the identified second user is not registered with the commerce service provided by server system 120 (FIG. 1). Thus, server system 120 (FIG. 1) sends a notification to the second user prompting him/her to create an account or profile associated with the commerce service. Then, when the second user creates an account with the commerce service, server system 120 (FIG. 1) adds the second user to the first user's trust graph. Alternatively, server system 120 (FIG. 1) creates an account or profile in the commerce service for the second user without any involvement from the second user (e.g., a preliminary or placeholder account or profile), adds the second user to the first user's trust graph, and send a notification to the second user to discover the commerce system (e.g., complete filing out the details of the preliminary or placeholder account or profile) and that the account or profile has been created for them.

In some embodiments, prior to identifying a second user associated with an event, the server (1306): receives a notification from the first user to determine users who are associated with events; in response to receiving the notification, determines a set of users associated with events; and presents the set of users associated with upcoming events to the first user. In some embodiments, in response to a notification from the first user, server system 120 (FIG. 1) determines a set of users who are associated with upcoming or recently past events (e.g., upcoming or belated birthdays, anniversaries, holidays, and so on) based on the first user's trust graph. For example, three users included in the first user's trust graph have birthdays in the next week. Furthermore, after determining the set of users, server system 120 (FIG. 1) presents the set of users who are associated with upcoming or recently past events (e.g., upcoming or belated birthdays, anniversaries, holidays, and so on) to the first user. In some embodiments, presenting the set of users to the first user includes sending a web page or interface with the set of users who are associated with upcoming or recently past events (e.g., upcoming or belated birthdays, anniversaries, holidays, and so on) to client system 102 (FIG. 1) for presentation/display to the first user via the web browser or local application associated with the commerce service.

In some embodiments, the server receives (1308) a notification from the first user selecting the second user from the set of users who are associated with events, where the second user is identified based on the notification selecting the second user from the set of users who are associated with events. In some embodiments, after presenting the set of users to the first user, server system 120 (FIG. 1) receives a notification from client system 102 (FIG. 1) indicating selection of a second user in the set of users who are associated with upcoming or recently past events (e.g., upcoming or belated birthdays, anniversaries, holidays, and so on) for whom to buy a gift. For example, the first user views a page of users with upcoming events and selects the second user for whom to purchase a gift for their upcoming birthday.

In some embodiments, after point E, the server identifies (1310) the second user who is associated with the event. In some embodiments, server system 120 (FIG. 1) determines a second user who is associated with an upcoming or recently past event (e.g., upcoming or belated birthday, anniversary, graduation, holiday, or the like) based on the first user's trust graph. For example, the second user is included in the first user's trust graph and has his/her birthday in the next week.

The server determines (1312) one or more potential products (e.g., goods or services) for the second user according to one or more predefined criteria. In some embodiments, server system 120 (FIG. 1) determines one or more potential products for the first user to purchase for the identified second user for their upcoming or belated event. For example, server system 120 (FIG. 1) determines that the first user's sister has an upcoming graduation, and server system 120 (FIG. 1) determines one or more potential gifts for the first user's sister's graduation, such as flowers, a briefcase, a pair of tickets to the Opera, a subscription to Field & Stream, or the like, according to one or more predefined criteria.

In some embodiments, as part of the server determining (1312) the one or more potential products, the one or more predefined criteria include (1314) at least one of a trust graph associated with the first user, a trust graph associated with the second user, and a predefined budget. In some embodiments, server system 120 (FIG. 1) determines the one or more potential gifts based on a trust graph associated with the first user (i.e., the giftor), a trust graph associated with the second user (i.e., the giftee), a budget predetermined by the first user, or a combination thereof. As such, the one or more potential gifts will suit the tastes of the first and/or second user and fit within budget. Additionally or alternatively, in some embodiments, server system 120 (FIG. 1) determines the one or more potential gifts based on a user profile associated with the second user, which includes previous purchases, search history, viewing history, prior product reviews, and/or prior product recommendations of the second user.

In some embodiments, prior to causing the at least one product of the one or more determined potential products to be purchased, the server: presents (1316) at least one product of the one or more determined potential products to the first user; and receives a notification from the first user selecting at least one of the one or more determined potential products for the second user to be purchased. In some embodiments, server system 120 (FIG. 1) presents the one or more potential gifts to the first user (e.g., as a gift guide). For example, the second user is the first user's wife whose birthday is coming up soon, and the gift guide includes products associated with the wife's trust graph. In this example, the first user (i.e., the husband) is reminded of his wife's upcoming birthday and is presented with gift options (i.e., a gift guide) that suit his wife's taste. In FIG. 12, for example, collection 1032 is generated by server system 120 and includes products 1078 suiting the first user's wife's taste or appropriate birthday gifts. In another example, collection 1032 includes products 1078 associated with both the first user's trust graph (e.g., the husband) and the second user's trust graph (e.g., the wife). In some embodiments, presenting the one or more potential gifts to the first user includes sending a web page or interface with the one or more potential gifts to client system 102 for presentation/display to the first user via the web browser or local application associated with the commerce service.

Returning to FIGS. 18-19, the server causes (1318) at least one product of the one or more determined potential products to be purchased for the second user by a first user. In some embodiments, server system 120 (FIG. 1) causes a product selected by the first user from the one or more potential products to be purchased by the first user for the second user. In some embodiments, server system 120 causes the selected product to be purchased by purchasing the selected product and billing the first user or, alternatively, by prompting an external mechanism to purchase the selected product.

In some embodiments, as part of the server causing (1318) the at least one or more potential products to be purchased, the least one product from the set of products is caused to be purchased (1320) by the first user for the second user without receiving further notification or input from the first user. In some embodiments, server system 120 (FIG. 1) causes a product from among the one or more potential products to be purchased by the first user for the second user without further notification or interaction from the first user. For example, after determining the one or more potential products, server system 120 (FIG. 1) selects product(s) from the one or more potential products and causes the selected product(s) to be purchased by the first user for the second user by purchasing the selected product(s) and billing the respective user. Alternatively, server system 120 (FIG. 1) prompts an external mechanism to purchase the selected product(s). As such, server system 120 (FIG. 1) purchases a gift for the second user without involvement from the first user.

In some embodiments, after causing the least one product of the one or more determined potential products to be purchased, the server causes (1322) at least one product to be shipped to the second user for the event. In some embodiments, server system 120 (FIG. 1) causes the purchased product to be shipped to the second user. For example, if the second user has an upcoming birthday, server system 120 (FIG. 1) causes the purchased product to be delivered/shipped to the second user prior to or on the day of the upcoming event associated with the second user.

In some embodiments wherein the transitive trust is calculated, the server system selects either the highest or lowest trust level from among the available trust paths or connections. In yet other implementations, the server system selects the implicit trust value that relies on the fewest number of connections or the shortest trust path. In some embodiments, if multiple trust paths have the same shortest trust path or the same fewest number of connections, the multiple trust values of each of the shortest trust paths are averaged.

In some implementations, the server system uses the gathered trust information to improve a user's experience (UX). As an example, the server system can use the trust graph associated with the requesting user, among other factors, to (a) determine one or more candidate recommending users from whom to request a new recommendation and/or (b) in the same or different embodiment, provide to the requesting user a previous recommendation from one or more candidate recommending users. In another embodiment, the server system identifies other recommending users who have similar recommendations or similar recommendation patterns to the recommending users that the requesting user already trusts. Of course, the requesting user can manually set or determine the trust level for particular categories, such as portable computing devices 714 (FIG. 7), where such manual setting or determination can override any automated determination described above.

In some embodiments, the server system can designated a highly influential user within a specific category. For example, if Bob is highly trusted by a significant portion of registered users and/or has a high number of successful recommendations, Bob may be designated as a highly influential user with respect to a specific category for all new or other requesting users who have not made an explicit decision regarding whether to trust Bob.

As an example of the system avoiding flooding users with too many requests for recommendations, in some embodiments, the server system can provide incentives or rewards to the recommending users for responding to the requests for recommendations to motivate the recommending users to respond. Similarly, the server system can monitor whether the recommending users respond to the requests for recommendations, and can send fewer or no requests to particular recommending users if the particular recommending users do not respond to requests in a timely manner or at all regardless of how highly ranked the particular recommending users are. After a predetermined or other time period, the server system can reset and resume sending the normal quantity of requests for recommendations to the particular recommending users. In some embodiments, the server system can send a reminder about the request for a recommendation to the original recommending users. As another example, in some embodiments, a recommending user receives a reward or other form of compensation from the merchant who sold the item and/or from the requesting user who purchase the product or service based on the recommendation of the recommending user.

As an example of the server system using the extra recommendations to build the database of user recommendations, the server system might not need to send requests for a recommendation the next time that a different user requests the same or a similar recommendation. As an example of changing trustworthiness levels, in some embodiments, if Alice, on recommendation from Bob purchases a product, but subsequently returns the product because she did not like the product, the server system will decrease the trust level from Alice to Bob back to the previous level or to a lower level, and/or Bob's overall trustworthiness score is decreased to his previous level or to a lower level. As another example, if Alice submits a bad review for the smart phone she purchased, the server system will decrease her trust level for the user who submitted the recommendation, and/or the server system will decrease the overall trust level for the user who submitted the recommendation.

In accordance with some embodiments, the recommendation request module 124 (FIG. 1) stores a plurality of recommendation requests 112-1 through 112-P in the recommendation data structure 402. As an example, recommendation data structure 402 can be part of recommendation request module 124 (FIG. 1) and/or recommendation database 142 (FIG. 1.)

FIG. 5 depicts a block diagram of an exemplary trust indication data structure 502 for trust indications 114 that are sent to server system 120 (FIG. 1) to build a trust graph for each user. As an example, trust indication data structure 502 can be part of user profile information 150 (FIG. 1) and/or trust graph database 152 (FIG. 1).

In FIGS. 9-10, as a further example of fulfilling the recommendation request, the server can continue to identify (906) additional users, rank (908) the additional users, identify (910) additional recommenders from the additional users, and/or send (912) additional requests for recommendations to the additional recommenders until the server receives (914) a minimum or sufficient number of recommendations. FIG. 10 illustrates a continuation of method 900 according to some embodiments. In some embodiments, from point A, in accordance with a determination that the received recommendation satisfies the criteria, the server transmits (918) the recommendation to the first user. The recommendation sent to the first user is sent via one or more communication methods such as email, SMS/MMS, social media network posts or messages (e.g., via Facebook or Twitter), instant messaging services, voicemail, or a messaging service internal to the server. The transmission can be repeated for each recommendation to be sent to the first user, or a single transmission can be used to send multiple recommendations to the first user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will also be understood that, although the terms first, second, etc. may be used herein to describe various elements, these elements should not be limited by these terms. These terms are only used to distinguish one element from another. For example, a first user could be termed a second user, and, similarly, a second user could be termed a first user, without departing from the scope of the present embodiments. The first user and the second user are both users, but they are not the same user.

The terminology used in the description of the embodiments herein is for the purpose of describing particular embodiments only and is not intended to be limiting. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method being implemented via execution of computing instructions configured to run at one or more processors and stored at one or more non-transitory computer-readable media, the method comprising:

providing a gift exchange software application ("app") configured to initiate a gift exchange among a set of participants comprising a menu and first trust graph information of a first respective participant of the set of participants, wherein the menu is configured to allow the first respective participant access to the first trust graph information of a first trust graph of the first respective participant from a server, without launching the first trust graph information on a mobile computing device of the first respective participant, and to select a gift exchange recipient from one or more trusted users of the first trust graph of the first respective participant for the gift exchange based at least in part on a level of trust the first respective participant has for the gift exchange recipient;

receiving the first trust graph information from the mobile computing device of the first respective participant;

transforming the first trust graph information into the first trust graph of the first respective participant to be retrieved from a trust database;

receiving at least two parameters for the gift exchange from an organizer of the gift exchange, wherein the at least two parameters comprise the set of participants and a budget;

displaying the menu on a user interface of the mobile computing device of the first respective participant, wherein a particular gift exchange recipient is selected from the one or more trusted users of the first trust graph of the first respective participant while the first trust graph information remains in an un-launched state;

identifying the particular gift exchange recipient for the first respective participant in the set of participants;

upon selection of the particular gift exchange recipient, accessing a second trust graph of the particular gift exchange recipient to determine one or more gifts for the particular gift exchange recipient, as identified, based at least in part on the budget and the second trust graph of the particular gift exchange recipient; and arranging for display on the user interface of the mobile computing device of the first respective participant the one or more gifts, as determined, for the particular gift exchange recipient;

wherein:
the first trust graph of the first respective participant comprises at least one level of trust associated with the particular gift exchange recipient.

2. The method of claim 1, wherein:
the particular gift exchange recipient is identified based at least in part on a second trust graph of another respective participant of the set of participants; and
the second trust graph comprises at least one level of trust associated with the first respective participant.

3. The method of claim 2, wherein:
the at least two parameters for the gift exchange further comprise a gift exchange theme; and
to determine the one or more gifts for the particular gift exchange recipient comprises to determine the one or more gifts for the particular gift exchange recipient based at least in part on the budget, the gift exchange theme, and the first trust graph of the first respective participant.

4. The method of claim 1, wherein:
the particular gift exchange recipient is selected at random from the set of participants and the one or more trusted users of the first trust graph of the first respective participant.

5. The method of claim 1, wherein:
the at least two parameters for the gift exchange further comprise a gift exchange theme; and
to determine the one or more gifts for the particular gift exchange recipient comprises to determine the one or more gifts for the particular gift exchange recipient based at least in part on the budget, the gift exchange theme, and the first trust graph of the first respective participant.

6. The method of claim 5, further comprising:
receiving a notification from the first respective participant selecting at least one of the one or more gifts.

7. The method of claim 1, further comprising:
receiving a notification from the first respective participant selecting at least one of the one or more gifts.

8. The method of claim 6, further comprising:
causing the at least one of the one or more gifts selected by the first respective participant to be purchased for the particular gift exchange recipient.

9. The method of claim 6, further comprising:
after receiving the notification, causing the at least one of the one or more gifts selected by the first respective participant to be purchased for the particular gift exchange recipient without further involvement from the first respective participant.

10. The method of claim 1, wherein:
the budget comprises a target budget range.

11. A method being implemented via execution of computing instructions configured to run at one or more processors and stored at one or more non-transitory computer-readable media, the method comprising:

providing a gift exchange software application ("app") configured to initiate a gift exchange among a set of participants comprising a menu and first trust graph information of a first respective participant of the set of participants, wherein the menu is configured to allow the first respective participant access to the first trust graph information of a first trust graph of the first respective participant from a server, without launching the first trust graph information from a mobile computing device of the first respective participant, and to select a gift exchange recipient from one or more trusted users of the first trust graph of the first respective participant for the gift exchange based at least in part on a level of trust the first respective participant has for the gift exchange recipient;

receiving the first trust graph information from the mobile computing device of the first respective participant;

transforming the first trust graph information into the first trust graph of the first respective participant to be retrieved from a trust database;

receiving two or more gift exchange parameters from an organizer of the gift exchange, wherein the two or more gift exchange parameters comprise the set of participants and a budget;

displaying the menu on a user interface of the mobile computing device of the first respective participant, wherein a particular gift exchange recipient is selected from the one or more trusted users of the first trust graph of the first respective participant while the first trust graph information remains in an un-launched state;

identifying the particular gift exchange recipient for the first respective participant in the set of participants;

upon selection of the particular gift exchange recipient, accessing a second trust graph of the particular gift exchange recipient to determine one or more gifts for the particular gift exchange recipient, as identified, based at least in part on the budget and the second trust graph of the particular gift exchange recipient; and arranging for display on the user interface of the mobile computing device of the first respective participant the one or more gifts, as determined, for the particular gift exchange recipient;

wherein:
identifying the particular gift exchange recipient for the first respective participant in the set of participants comprises identifying the particular gift exchange recipient based at least in part on the first trust graph of the first respective participant;

the particular gift exchange recipient is selected at random from the set of participants; and to determine the one or more gifts for the particular gift exchange recipient comprises to determine the one or more gifts based at least in part on a budget and the second trust graph of the particular gift exchange recipient.

12. The method of claim 11, further comprising:
receiving a notification from the first respective participant selecting one or more of the one or more gifts; and
causing the one or more of the one or more gifts selected by the first respective participant to be purchased for the particular gift exchange recipient.

13. A system, comprising:
one or more processors; and
memory storing one or more programs to be executed by the one or more processors;
wherein:
the one or more programs comprise instructions for:
providing a gift exchange software application ("app") configured to initiate a gift exchange among a set of participants comprising a menu and first trust graph information of a first respective participant of the set of participants, wherein the menu is configured to allow the first respective participant access to the first trust graph information of the first respective participant from a server, without launching the first trust graph information from a mobile computing device of the first respective participant, and to select a gift exchange recipient from one or more trusted users of a first trust graph of the first respective participant for the gift exchange based at least in part on a level of trust the first respective participant has for the gift exchange recipient;
receiving the first trust graph information from the mobile computing device of the first respective participant;
transforming the first trust graph information into the first trust graph of the first respective participant to be retrieved from a trust database;
receiving at least two gift exchange parameters from an organizer of the gift exchange, the at least two gift exchange parameters comprise the set of participants and a budget;
displaying the menu on a user interface of the mobile computing device of the first respective participant, wherein a particular gift exchange recipient is selected from the one or more trusted users of the first trust graph of the first respective participant while the first trust graph information remains in an un-launched state;
identifying the particular gift exchange recipient for the first respective participant in the set of participants; and
upon selection of the particular gift exchange recipient, accessing a second trust graph of the particular gift exchange recipient to determine one or more gifts for the particular gift exchange recipient, as identified, based at least in part on the budget and the second trust graph of the particular gift exchange recipient; and
arranging for display on the user interface of the mobile computing device of the first respective participant the one or more gifts, as determined, for the particular gift exchange recipient;
wherein:
the first trust graph of the first respective participant comprises at least one level of trust associated with the particular gift exchange recipient.

14. The system of claim 13, further comprising:
an input; and
a display;
wherein:
the display outputs to the first respective participant the one or more gifts determined for the particular gift exchange recipient; and
the input receives a selection from the first respective participant of one or more gifts from the one or more gifts.

15. The system of claim 13, wherein:
the particular gift exchange recipient is identified based at least in part on the second trust graph; and
the second trust graph comprises levels of trust associated with the first respective participant.

16. The system of claim 15, wherein:
the at least two gift exchange parameters further comprise a gift exchange theme; and
to determine the one or more gifts for the particular gift exchange recipient based at least in part on the budget, the gift exchange theme, and the first trust graph of the first respective participant.

17. The system of claim 13, wherein:
the particular gift exchange recipient is identified at random from the set of participants and the one or more trusted users of the first trust graph of the first respective participant.

18. The system of claim 13, wherein:
the one or more programs further comprise instructions for:
receiving a notification from the first respective participant selecting at least one of the one or more gifts.

19. The system of claim 18, wherein:
the one or more programs further comprise instructions for:
causing the at least one of the one or more gifts selected by the first respective participant to be purchased for the particular gift exchange recipient.

20. The system of claim 13, wherein:
the one or more programs further comprise instructions for:
after receiving a notification, causing at least one of the one or more gifts selected by the first respective participant to be purchased for the particular gift exchange recipient without further involvement from the first respective participant.

* * * * *